(12) United States Patent
Hori et al.

(10) Patent No.: US 7,622,215 B2
(45) Date of Patent: Nov. 24, 2009

(54) COMPOSITE ELECTROLYTE MEMBRANE, CATALYST-COATED MEMBRANE ASSEMBLY, MEMBRANE-ELECTRODE ASSEMBLY AND POLYMER ELECTROLYTE FUEL CELL

(75) Inventors: Yoshihiro Hori, Ikoma (JP); Akihiko Yoshida, Hirakata (JP); Mikiko Yoshimura, Hirakata (JP); Makoto Uchida, Hirakata (JP); Shinji Kinoshita, Yokohama (JP); Hirokazu Wakabayashi, Yokohama (JP)

(73) Assignees: Panasonic Corporation, Osaka (JP); Asahi Glass Co., Ltd., Tokyo (JP)

( * ) Notice: Subject to any disclaimer, the term of this patent is extended or adjusted under 35 U.S.C. 154(b) by 1030 days.

(21) Appl. No.: 11/071,575

(22) Filed: Mar. 4, 2005

(65) Prior Publication Data

US 2005/0227132 A1    Oct. 13, 2005

(30) Foreign Application Priority Data

Mar. 4, 2004    (JP)    ............... 2004-061257

(51) Int. Cl.
*H01M 4/00* (2006.01)
*H01M 8/10* (2006.01)
*H01M 6/04* (2006.01)

(52) U.S. Cl. ............... 429/40; 429/41; 429/30; 429/126

(58) Field of Classification Search ............ 429/40, 429/41, 30, 126
See application file for complete search history.

(56) References Cited

U.S. PATENT DOCUMENTS

| | | | |
|---|---|---|---|
| 4,387,144 A * | 6/1983 | McCallum et al. | 429/251 |
| 4,849,144 A * | 7/1989 | McLoughlin | 264/45.9 |
| 5,326,391 A * | 7/1994 | Anderson et al. | 106/409 |
| 6,183,901 B1 * | 2/2001 | Ying et al. | 429/129 |
| 6,602,593 B1 * | 8/2003 | Callahan et al. | 428/316.6 |
| 7,455,928 B2 * | 11/2008 | Mathias et al. | 429/42 |

FOREIGN PATENT DOCUMENTS

| | | |
|---|---|---|
| JP | 61-246394 | 11/1986 |
| JP | 06-231779 | 8/1994 |
| JP | 2002-203576 | 7/2002 |

* cited by examiner

*Primary Examiner*—Patrick Ryan
*Assistant Examiner*—Helen O Chu
(74) *Attorney, Agent, or Firm*—McDermott Will & Emery LLP

(57) ABSTRACT

To provide a polymer electrolyte membrane having excellent size stability and excellent mechanical strength that can sufficiently prevent the size change due to the swelling condition, the displacement of the polymer electrolyte membrane and the formation of wrinkles during the production of the polymer electrolyte fuel cell, and can prevent damage during the production and operation of the polymer electrolyte fuel cell. In a composite electrolyte membrane including a porous reinforcement layer made of a resin and an electrolyte layer made of a polymer electrolyte and laminated at least one main surface of the reinforcement layer, the direction having a high tensile modulus of elasticity in the reinforcement layer is substantially corresponded with the direction having a high rate of size change in the electrolyte layer.

9 Claims, 12 Drawing Sheets

COMPOSITE ELECTROLYTE MEMBRANE, CATALYST-COATED MEMBRANE ASSEMBLY, MEMBRANE-ELECTRODE ASSEMBLY AND POLYMER ELECTROLYTE FUEL CELL

BACKGROUND OF THE INVENTION

The present invention relates to a polymer electrolyte fuel cell using hydrogen, methanol, methanol or dimethyl ether as a fuel and air or oxygen as an oxidant. More specifically, the present invention particularly relates to a composite electrolyte membrane, a catalyst-coated membrane assembly and a membrane-electrode assembly.

Conventional polymer electrolyte fuel cells employing a cation (hydrogen ion) conductive polymer electrolyte generate electricity and heat by electrochemically reacting a fuel gas containing hydrogen and an oxidant gas containing oxygen such as air.

FIG. 17 is a schematic cross sectional view illustrating a basic structure of a unit cell designed to be mounted in a conventional polymer electrolyte fuel cell. FIG. 18 is a schematic cross sectional view illustrating a basic structure of a membrane-electrode assembly designed to be mounted in the unit cell 110 shown in FIG. 17. As shown in FIG. 17, in a membrane-electrode assembly 101, on each surface of a polymer electrolyte membrane 111 capable of selectively transporting hydrogen ions is formed a catalyst layer 112 composed of a hydrogen ion conductive polymer electrolyte and a catalyst body obtained by allowing carbon powders to carry an electrode catalyst (e.g. platinum metal catalyst).

As the polymer electrolyte membrane 111, polymer electrolyte membranes made of perfluorocarbonsulfonic acid such as Nafion (trade name) available from E.I. Du Pont de Nemours & Co. Inc., USA are now widely used.

On the outer surface of each catalyst layer 112 is formed a gas diffusion layer 113 made of, for example, carbon paper treated for water repellency and having gas permeability and electron conductivity. The combination of the catalyst layer 112 and the gas diffusion layer 113 constitutes an electrode 114 (anode or cathode).

A conventional unit cell 110 is composed of a membrane-electrode assembly 101, gaskets 115 and a pair of separators 116. The gaskets 115 are arranged on the outer periphery of the electrodes with the polymer electrolyte membrane 111 sandwiched therebetween so as to prevent the supplied fuel gas and the supplied oxidant gas from leaking out and to prevent them from mixing with each other. The gaskets 115 are usually integrated in advance with the electrodes and the polymer electrolyte membrane 111. In some cases, the combination of the electrodes and the polymer electrolyte membrane 111 and gaskets 115 is called "membrane-electrode assembly".

On the outer surfaces of the membrane-electrode assembly 101 are placed a pair of separators 116 for mechanically fixing the membrane-electrode assembly 101. On the surface of the separator 116 in contact with the membrane-electrode assembly 101 is formed gas channels 117 for supplying a reaction gas (fuel gas or oxidant gas) to the gas diffusion electrode 114 and removing a gas containing an electrode reaction product and unreacted reaction gas from the reaction site to the outside of the electrodes. Although the gas channels 117 may be formed independently of the separator 116, they are usually formed by providing grooves on the surface of the separator as shown in FIG. 17.

A single unit cell constructed by fixing the membrane-electrode assembly 101 with a pair of separators 116 can produce an electromotive force of about 0.7 to 0.8 V at a practical current density of several tens to several hundreds mA/cm² when a fuel gas is supplied to the gas channel 117 of one of the separators 116 and an oxidant gas is supplied to the gas channel 117 of the other of the separators 116.

Polymer electrolyte fuel cells, however, are usually required to produce a voltage of several to several hundreds volts when used as power sources. For this reason, in practice, the required number of unit cells are connected in series to give a stack for use.

In order to supply the reaction gas to the gas channel 117, there is required a manifold in which a pipe for supplying the reaction gas is branched into a corresponding number of separators 116 and the branched pipes are directly connected to the gas channels on the separators 116. Particularly, a manifold in which external pipes for supplying the reaction gas are directly connected to the separators 116 is called "external manifold".

On the other hand, there is another type of manifold called "internal manifold", which has a simpler structure. An internal manifold is composed of apertures formed in the separators 116 having gas channels 117 formed thereon. The inlet and outlet apertures are connected with the gas channel 117. The reaction gas can be supplied to the gas channel 117 directly from the aperture.

In a polymer electrolyte fuel cell as described above, the electrode reaction occurs on the surface of the catalyst contained in the catalyst layer 112. In the anode-side catalyst layer 112, the reaction represented by the formula (1) occurs. In the cathode-side catalyst layer 112, the reaction represented by the formula (2) occurs. The entire reaction is represented by the formula (3).

$$H_2 \rightarrow 2H^+ + 2e \tag{1}$$

$$1/2O_2 + 2H^+ + 2e \rightarrow H_2O \tag{2}$$

$$H_2 + 1/2O_2 \rightarrow H_2O \tag{3}$$

The reaction given above produces an electromotive force, thus enabling power generation. Due to this electrode reaction, water is produced at the cathode-side catalyst layer 112. In the reaction, H⁺ generated at the anode-side catalyst layer 112 migrate through the polymer electrolyte membrane 111 to the cathode-side catalyst layer 112. A single H⁺ migrates along with 5 to 20 water molecules.

The polymer electrolyte membrane 111 exhibits high hydrogen ion conductivity only when it is sufficiently swelled with water. However, because a large amount of water is transferred to the cathode along with H⁺ that migrates through the polymer electrolyte membrane 111, it is necessary to continually supply water to the polymer electrolyte membrane 111. The water is supplied from the gas channel 17 to the gas diffusion layer in the form of water vapor, and it passes through the cathode or the anode to the polymer electrolyte membrane 111. An excess amount of water, which is not used by the polymer electrolyte membrane 111, in the water generated in the cathode-side catalyst layer 112 is expelled from the gas channel 117 to the outside through the gas diffusion layer 113.

Generally speaking, the polymer electrolyte membrane 111 has the property that its size varies greatly depending on the water impregnated condition of the polymer electrolyte membrane 111. Accordingly, problems arise during the production of a cell or stack in the manufacturing process of a polymer electrolyte fuel cell such as difficulty in alignment of the polymer electrolyte membrane 111 and formation of wrinkles in the polymer electrolyte membrane 111. Further, the polymer electrolyte membrane 111 usually has insufficient mechanical strength, and therefore it might be damaged during the production or operation of a polymer electrolyte fuel cell.

In an attempt to solve the above problems, for example, Japanese Examined Patent Publication No. Hei 05-75835 (Patent Document 1) proposes to use an electrolyte membrane obtained by impregnating a porous film made of polytetrafluoroethylene with a perfluorocarbon polymer having a sulfonic acid group. Japanese Laid-Open Patent Publication No. Hei 06-231779 (Patent Document 2) proposes a polymer electrolyte membrane reinforced by fibrillated perfluorocarbon polymer. Further, Japanese Laid-Open Patent Publication No. 2002-203576 (Patent Document 3) proposes a polymer electrolyte membrane reinforced by a film having apertures with a cross sectional area of not greater than 300,000 nm$^2$ extending vertically in the thickness direction.

However, even with the use of the techniques proposed by Patent Documents 1 to 3, the size change of a water impregnated polymer electrolyte membrane could not be suppressed sufficiently. In addition thereto, the mechanical strength of the polymer electrolyte membrane was not sufficient, either.

In other words, even when the techniques disclosed in Patent Documents 1 to 3 are used, the size of a polymer electrolyte membrane varies depending on the water impregnated condition, the polymer electrolyte membrane is displaced during the production of a cell or stack, wrinkles are caused in the polymer electrolyte membrane, or the polymer electrolyte membrane is damaged during the production or operation of a polymer electrolyte membrane. Accordingly, there still existed room for improvement.

In view of the above problems, an object of the present invention is to provide a polymer electrolyte membrane for a polymer electrolyte fuel cell having excellent size stability and excellent mechanical strength that can sufficiently prevent the size change due to the water impregnated condition, the displacement of the polymer electrolyte membrane and the formation of wrinkles during the production of the polymer electrolyte fuel cell, and can sufficiently prevent damage during the production and operation of the polymer electrolyte fuel cell.

Further, another object of the present invention is to provide a highly reliable polymer electrolyte fuel cell that can sufficiently prevent the displacement of the polymer electrolyte membrane and the degradation resulting from wrinkles and damage, and can exhibit sufficient cell performance for a long period of time.

BRIEF SUMMARY OF THE INVENTION

In order to solve the above problems, the present invention provides a composite electrolyte membrane including: a reinforcement layer made of a resin and having apertures therein; and an electrolyte layer made of a polymer electrolyte and laminated at least one main surface of the reinforcement layer, wherein, assuming that an orthogonal coordinate system having an $X_1$ axis and a $Y_1$ axis is fixed on a main surface of the reinforcement layer, the reinforcement layer has strength anisotropy in which the tensile modulus of elasticity in the direction of the $X_1$ axis is greater than the tensile modulus of elasticity in the direction of the $Y_1$ axis, assuming that an orthogonal coordinate system having an $X_2$ axis and a $Y_2$ axis is fixed on a main surface of the electrolyte layer, the electrolyte layer has size anisotropy in which the rate of size change in the direction of the $X_2$ axis is greater than the rate of size change in the direction of the $Y_2$ axis, and, the reinforcement layer and the electrolyte layer are laminated such that the direction of the $X_1$ axis substantially corresponds with the direction of the $X_2$ axis when observed from a direction substantially parallel to the normal line direction of the main surface of the reinforcement layer and the main surface of the electrolyte layer.

The condition "the direction of the $X_1$ axis substantially corresponds with the direction of the $X_2$ axis" used herein means a condition in which the direction of the $X_1$ axis and the direction of the $X_2$ axis are parallel, and in which they are in agreement (parallel) with each other with a "deviation" within the scope that the effect of the present invention is obtained. The deviation includes a displacement resulting from a difference caused during the alignment step in the production of the composite electrolyte membrane of the present invention, etc.

Further, the term "tensile modulus of elasticity" of the reinforcement layer in the present invention is a value determined by dividing the tensile modulus of elasticity calculated from stress corresponding to a distortion of specified two points measured according to JIS K 7127 measurement method by the grammage (the weight of the reinforcement layer per unit area (g/m$^2$)).

To be more specific, the reinforcement layer is cut out into the test piece shape No. 2 (strip-shaped sample having a width of 10 mm and a length of 150 mm) specified by JIS K 7127. The sample is pulled at a test rate of 50 mm/min with a distance from the reference line of 50 mm and a chuck-to-chuck distance of 100 mm, during which the displacement and the stress are measured. The measurement is performed using five different samples, and the tensile modulus of elasticity is determined from the average thereof.

When the electrolyte layer of the present invention is impregnated with warm water during the operation of the polymer electrolyte fuel cell, it usually contracts, resulting in a change in size. The "rate of size change" of the electrolyte layer of the present invention means a value obtained from the size measured before and that measured after the immersion of the electrolyte layer in warm water, when the electrolyte layer is first allowed to stand in an atmosphere of 25° C. with a relative humidity of 50% for 24 hours or more, after which the electrolyte layer is immersed in warm water maintained at 90° C. for two hours. In short, it is a value calculated from {(the size measured before the immersion−the size measured after the immersion)/the size measured before the immersion}×100(%).

The strength anisotropy of the reinforcement layer as described above can be realized by adjusting the arrangement pattern of the apertures formed in the reinforcement layer, the shape, the number, and the opening ratio (porosity) of the same.

Because the composite electrolyte membrane of the present invention has the structure described above, and the reinforcement layer and the electrolyte layer are laminated such that the $X_1$ axis direction having a high tensile modulus of elasticity in the reinforcement layer substantially corresponds with the $X_2$ axis direction having a high rate of size change in the electrolyte layer, the size change of the electrolyte layer in the direction of the $X_2$ axis is effectively prevented by the high tensile modulus of elasticity of the reinforcement layer in the direction of the $X_1$ axis.

Accordingly, the composite electrolyte membrane of the present invention has excellent size stability and excellent mechanical strength and is capable of sufficiently preventing the size change resulting from the water impregnated condition, the displacement thereof and the formation of wrinkles during the production of the polymer electrolyte fuel cell, as well as capable of sufficiently preventing damage during the production of the polymer electrolyte fuel cell. Thereby, it is possible to easily and surely provide a catalyst-coated membrane assembly, a membrane-electrode assembly and a polymer electrolyte fuel cell which are highly reliable and capable of exhibiting sufficient cell performance for a long period of time.

The present invention further relates to a catalyst-coated membrane assembly including the aforesaid composite electrolyte membrane and a catalyst layer formed on at least one main surface of the composite electrolyte membrane by applying an ink for forming the catalyst layer in a strip pattern such that the width direction of the strip portions substantially corresponds with the direction of the $X_1$ axis.

The condition "the width direction of the strip portions substantially corresponds with the direction of the $X_1$ axis" used herein means a condition in which the width direction of the strip portions and the direction of the $X_1$ axis are substantially parallel, and in which they are in agreement (parallel) with each other with a "deviation" within the scope that the effect of the present invention is obtained. The deviation includes a displacement resulting from a difference caused during the alignment step in the production of the catalyst-coated membrane assembly of the present invention, etc. The term "width direction of the strip portions" will be described later in detail with reference to FIG. 7.

Because the catalyst-coated membrane of the present invention includes the aforesaid composite electrolyte membrane, the size of the composite electrolyte membrane does not change by the water impregnated condition, displacement and wrinkles are not caused during the production of the polymer electrolyte fuel cell, and damage is not caused during the production and operation of the polymer electrolyte fuel cell.

Moreover, because the reinforcement layer and the composite electrolyte membrane are laminated such that the $X_1$ axis direction having a high tensile modulus of elasticity in the reinforcement layer substantially corresponds with the width direction of the strip portions constituting the catalyst layer where the size change during drying is large, the size change of the catalyst layer in the width direction of the strip portions is effectively prevented by the high tensile modulus of elasticity of the reinforcement layer in the direction of the $X_1$ axis.

Thus, it is possible to easily and surely realize a membrane-electrode assembly and a polymer electrolyte fuel cell which are highly reliable and capable of exhibiting sufficient cell performance for a long period of time.

The present invention further provides a membrane-electrode assembly comprising the aforesaid catalyst-coated membrane assembly and a pair of gas diffusion layers sandwiching the catalyst-coated membrane assembly, wherein, assuming that an orthogonal coordinate system having an $X_3$ axis and a $Y_3$ axis is fixed on a main surface of the gas diffusion layer, the gas diffusion layer has strength anisotropy in which the tensile strength in the direction of the $X_3$ axis is greater than the tensile strength in the direction of the $Y_3$ axis, and the catalyst-coated membrane assembly is sandwiched by the pair of gas diffusion layers such that the direction of the $X_1$ axis is substantially orthogonal to the direction of the $X_3$ axis.

The condition "the direction of the $X_1$ axis is substantially orthogonal to the direction of the $X_3$ axis" used herein means a condition in which the direction of $X_1$ axis and the direction of $X_3$ axis are orthogonal with each other with a "deviation" within the scope that the effect of the present invention is obtained. The deviation includes a displacement resulting from a difference caused during the alignment step in the production of the membrane-electrode assembly of the present invention, etc.

The tensile strength of the gas diffusion layer of the present invention is measured according to ASTMD 1682-64 Section 17. Specifically, the gas diffusion layer is cut into a size of 35 mm in width and 150 mm in length to give a strip-shaped sample. A notch is cut in the center of the obtained sample so that the sample has an effective width of 25 mm. The notched sample is pulled at a test rate of 300 mm/min with a gauge length of 75 mm, during which the displacement is measured. The obtained measured value is divided by 25 mm and then multiplied by 9.81 to give the tensile strength.

Because the membrane-electrode assembly of the present invention includes the aforesaid catalyst-coated membrane assembly, the size of the composite electrolyte membrane does not change by the water impregnated condition, displacement and wrinkles are not caused during the production of the polymer electrolyte fuel cell, and damage is not caused during the production and operation of the polymer electrolyte fuel cell.

Moreover, because the catalyst-coated membrane assembly and the gas diffusion layer are laminated such that the $X_1$ axis direction having a high tensile modulus of elasticity in the reinforcement layer is substantially orthogonal to the $X_3$ axis direction having a large tensile strength in the gas diffusion layer, the size change of the electrolyte layer in the direction of the $X_2$ axis is effectively prevented by the high tensile modulus of elasticity of the reinforcement layer in the direction of the $X_1$ axis, and at the same time, the strength isotropy of the membrane-electrode assembly is ensured by the tensile strength of the gas diffusion layer in the direction of the $X_3$ axis.

Thus, it is possible to easily and surely realize a polymer electrolyte fuel cell which is highly reliable and capable of exhibiting sufficient cell performance for a long period of time.

Further, the present invention provides a polymer electrolyte fuel cell comprising the aforesaid membrane-electrode assembly and a pair of separator plates sandwiching the membrane-electrode assembly, wherein the separator plate has a gas channel for supplying a reaction gas to the membrane-electrode assembly, the entire or most of the gas channel comprises a linear groove, and the membrane-electrode assembly is sandwiched by the pair of separator plates such that the direction of the $X_1$ axis is substantially orthogonal to the direction of the linear groove.

The condition "the direction of the $X_1$ axis is substantially orthogonal to the direction of the linear groove" used herein means a condition in which the direction of the $X_1$ axis and the direction of the linear groove are orthogonal with each other with a "deviation" within the scope that the effect of the present invention is obtained. The deviation includes a displacement resulting from a difference caused during the alignment step in the production of the polymer electrolyte fuel cell of the present invention, etc. In addition, the term "direction of the linear groove" will be described later in detail with reference to FIGS. 9 and 10.

Because the polymer electrolyte fuel cell of the present invention includes the aforesaid membrane-electrode assembly, the size of the composite electrolyte membrane does not change by the water impregnated condition, displacement and wrinkles are not caused during the production of the polymer electrolyte fuel cell, and damage is not caused during the production and operation of the polymer electrolyte fuel cell.

Moreover, because the membrane-electrode assembly and the separator plate are laminated such that the $X_1$ axis direction having a high tensile modulus of elasticity in the reinforcement layer is substantially orthogonal to the direction of the linear groove of the gas channel on the separator plate, the size change of the electrolyte layer in the direction of the $X_2$ axis resulting from water contained in the reaction gas flowing the gas channel is effectively suppressed by the high tensile modulus of elasticity of the reinforcement layer in the direction of the $X_1$ axis.

Thus, it is possible to easily and surely realize a polymer electrolyte fuel cell which is highly reliable and capable of exhibiting sufficient cell performance for a long period of time.

According to the present invention, it is possible to obtain a composite electrolyte membrane for a polymer electrolyte fuel cell having excellent size stability and excellent mechanical strength that can sufficiently prevent the size change due to the water impregnated condition, the displacement thereof and the formation of wrinkles during the production of the polymer electrolyte fuel cell, and can sufficiently prevent damage during the production and operation of the polymer electrolyte fuel cell.

Further, according to the present invention, by using the aforesaid composite electrolyte membrane, it is possible to easily and surely obtain a catalyst-coated membrane assembly, a membrane-electrode assembly and a polymer electrolyte fuel cell which are highly reliable and capable of exhibiting sufficient cell performance for a long period of time.

DETAILED DESCRIPTION OF THE INVENTION

Figure 1:
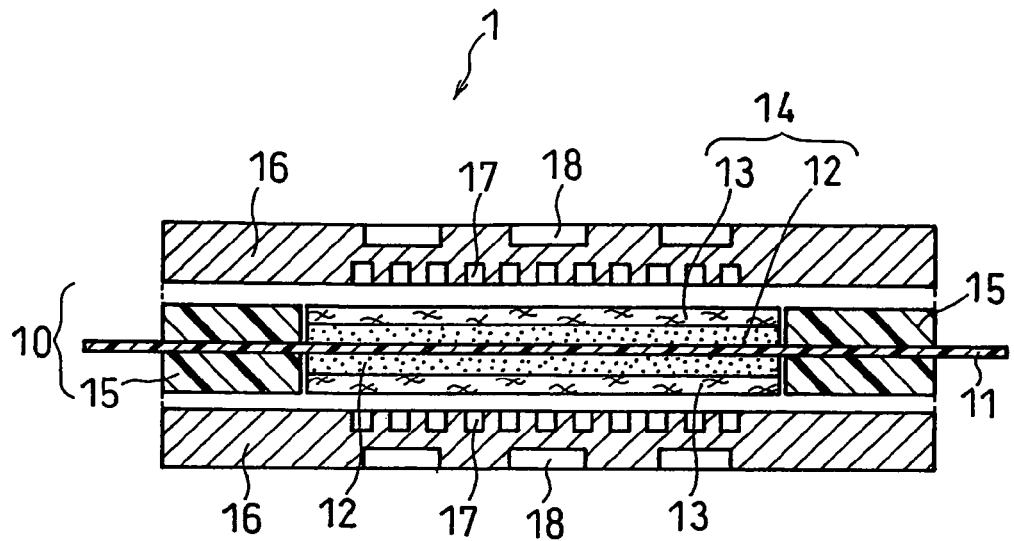
FIG. 1 is a schematic cross sectional view illustrating a basic structure of a unit cell designed to be mounted in a polymer electrolyte fuel cell according to Embodiment 1 of the present invention.

Preferred embodiments of the present invention will be described below with reference to the accompanying drawings. It is to be understood that the same reference numerals are given to the same or corresponding parts, and some redundant descriptions are omitted.

Embodiment 1

Figure 2:
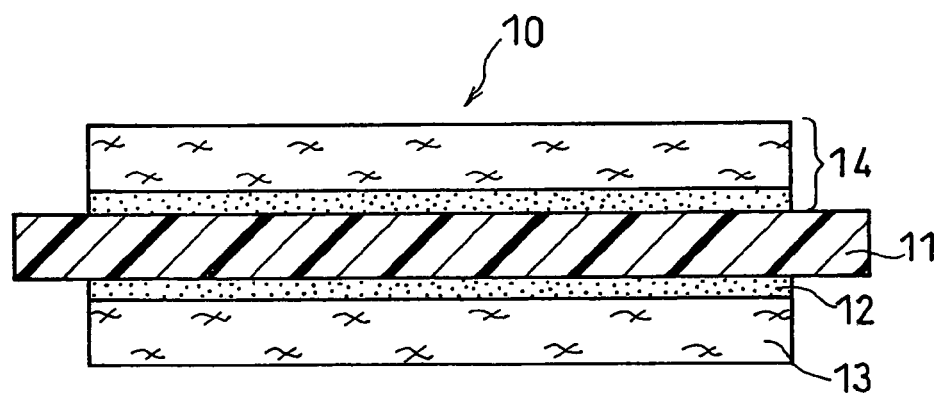
FIG. 2 is a schematic cross sectional view illustrating a basic structure of a membrane-electrode assembly (MEA) designed to be mounted in the unit cell 1 shown in FIG. 1.

FIG. 1 is a schematic cross sectional view illustrating a basic structure of a unit cell designed to be mounted in a polymer electrolyte fuel cell according to Embodiment 1 of the present invention. FIG. 2 is a schematic cross sectional view illustrating a basic structure of a membrane-electrode assembly (MEA) designed to be mounted in the unit cell 1 shown in FIG. 1.

Figure 3:
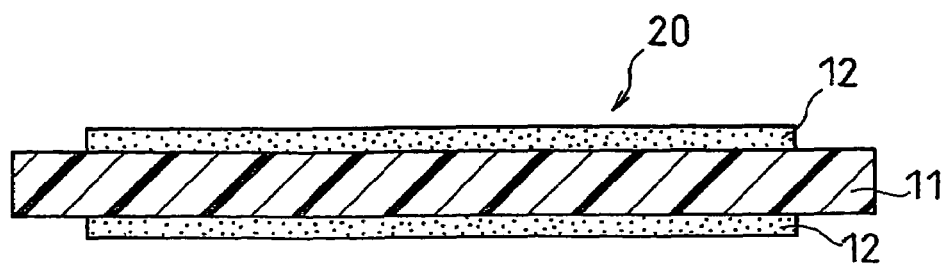
FIG. 3 is a schematic cross sectional view illustrating a basic structure of a catalyst-coated membrane assembly designed to be mounted in the membrane-electrode assembly 10 shown in FIG. 2.
Figure 4:
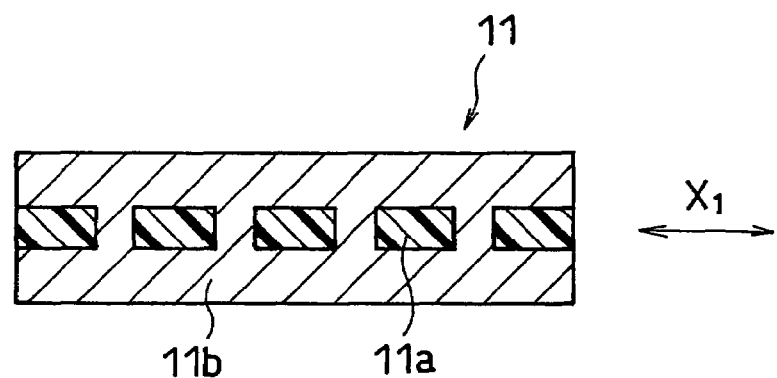
FIG. 4 is a schematic cross sectional view of a relevant part of a composite electrolyte membrane 11 according to Embodiment 1 of the present invention.

FIG. 3 is a schematic cross sectional view illustrating a basic structure of a catalyst-coated membrane assembly designed to be mounted in the membrane-electrode assembly 10 shown in FIG. 2. FIG. 4 is a schematic cross sectional view illustrating a composite electrolyte membrane 11 to be mounted in the catalyst-coated membrane assembly 20 shown in FIG. 3.

As shown in FIGS. 1 to 3, in a membrane-electrode assembly 10 and a catalyst-coated membrane assembly 20, on each surface of a composite electrolyte membrane 11 of the present invention including an electrolyte layer made of a polymer electrolyte capable of selectively transporting hydrogen ions is formed a catalyst layer 12 containing a hydrogen ion conductive polymer electrolyte and a catalyst body obtained by allowing carbon powders to carry an electrode catalyst (e.g. platinum metal catalyst).

On the outer surface of the catalyst layer 12 is formed a gas diffusion layer 13 made of, for example, a porous conductive substrate such as carbon paper treated for water repellency and having gas permeability and electron conductivity. The combination of the catalyst layer 12 and the gas diffusion layer 13 constitutes a gas diffusion electrode (anode or cathode) 14. Although not shown in the drawings, a conductive water repellent layer containing a water repellent and conductive carbon powders is formed on the surface of the gas diffusion layer 13 to be in contact with the catalyst layer 12.

A unit cell 1 is composed of a membrane-electrode assembly 10, gaskets 15 and a pair of separators 16. The gaskets 15 are arranged on the outer periphery of the gas diffusion electrodes 14 with the polymer electrolyte membrane 11 sandwiched therebetween so as to prevent the supplied fuel gas and the supplied oxidant gas from leaking out and to prevent them from mixing with each other.

The gaskets 15 may be integrated in advance with the gas diffusion electrodes 14 and the polymer electrolyte membrane 11. In some cases, the combination of the gas diffusion electrodes 14 and the polymer electrolyte membrane 11 and gaskets 15 is called "membrane-electrode assembly".

On the outer surfaces of the membrane-electrode assembly 10 are placed a pair of separators 16 for mechanically fixing the membrane-electrode assembly 10. On the surface of the separator 16 to be in contact with the membrane-electrode assembly 10 is formed gas channels 17 for supplying a reaction gas (fuel gas or oxidant gas) to the gas diffusion electrode 14 and removing a gas containing an electrode reaction product and unreacted reaction gas from the reaction site to the outside of the electrodes.

Although the gas channel 17 is formed by providing a groove on one surface of the separator 16. On the other surface of the separator 16 is formed a cooling water channel 18 by providing a groove. When the unit cells 1 are stacked, the cooling water channel 18 of one unit cell 1 and the cooling water channel 18 of the adjacent unit cell 1 form a cooling unit.

A single unit cell 1 constructed by fixing the membrane electrode assembly 10 with a pair of the separators 16 can produce an electromotive force of about 0.7 to 0.8 V at a practical current density of several tens to several hundreds mA/cm$^2$ when the fuel gas is supplied to the gas channel 17 of one of the separators 16 and the oxidant gas is supplied to the gas channel 17 of the other of the separators 16.

Polymer electrolyte fuel cells, however, are usually required to produce a voltage of several to several hundreds volts when used as power sources. For this reason, in practice, the required number of unit cells 1 are connected in series to give a stack for use.

Although not shown in the drawings, in order to supply a reaction gas to the gas channel 17, there is required a manifold in which a pipe for supplying the reaction gas is branched into a corresponding number of separators 16 used and the branched pipes are directly connected to the channels on the separators 16.

In the present invention, either of an external manifold composed by connecting external pipes for supplying the reaction gas directly to the separators 16 and an internal manifold composed of apertures of the separators 16 combined together can be used. In the case of an internal manifold, the inlet and outlet apertures are connected with the gas channel 17. The reaction gas can be supplied to the gas channel 17 directly from the aperture.

Figure 5:
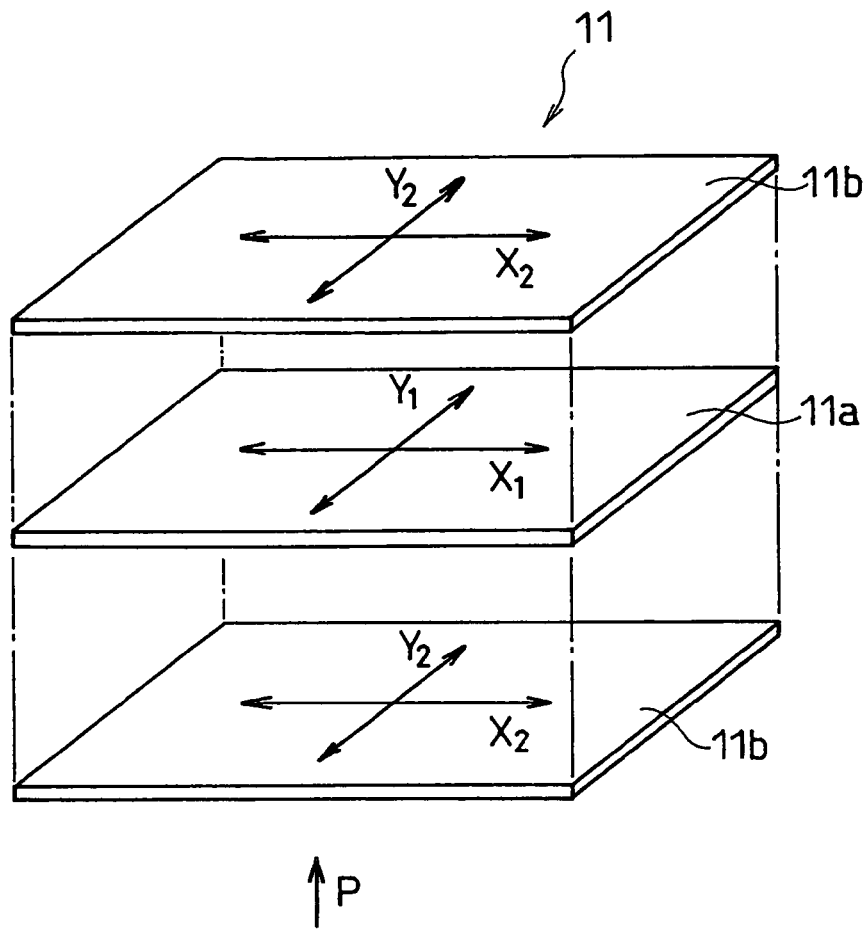
FIG. 5 is a schematic exploded perspective view of the composite electrolyte membrane 11 according to Embodiment 1 of the present invention.
Figure 6:
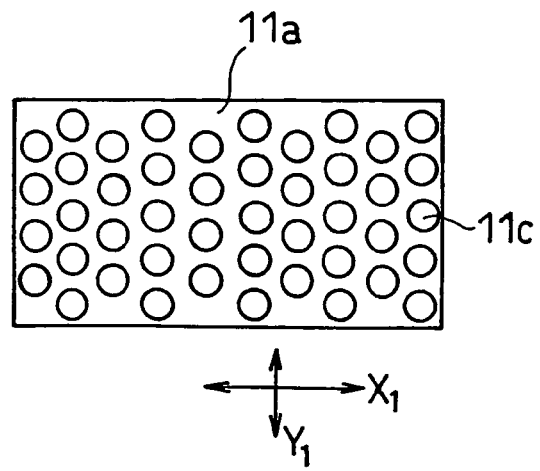
FIG. 6 is a top plan view of a reinforcement layer 11a included in the composite electrolyte membrane 11 according to Embodiment 1 of the present invention.

A composite electrolyte membrane 11 according to Embodiment 1 of the present invention will be described in further detail with reference to the accompanying drawings. FIG. 4 is a schematic cross sectional view of a relevant part of a composite electrolyte membrane 11 according to Embodiment 1 of the present invention. FIG. 5 is a schematic exploded perspective view of a composite electrolyte membrane 11 according to Embodiment 1 of the present invention. FIG. 6 is a top plan view of a reinforcement layer 11*a* included in the composite electrolyte membrane 11.

As shown in FIGS. 3 and 4, the composite electrolyte membrane 11 of the present invention is composed of a substantially rectangular-shaped porous reinforcement layer 11*a* made of a resin and a substantially rectangular-shaped electrolyte layer 11*b* made of a polymer electrolyte and laminated on each main surface of the reinforcement layer 11*a*.

Under the assumption that an orthogonal coordinate system having an $X_1$ axis and a $Y_1$ axis is fixed on a main surface of the reinforcement layer 11*a*, the reinforcement layer 11*a* has strength anisotropy in which the tensile modulus of elasticity in the direction of the $X_1$ axis is greater than the tensile modulus of elasticity in the direction of the $Y_1$ axis. Under the assumption that an orthogonal coordinate system having an $X_2$ axis and a $Y_2$ axis is fixed on a main surface of the electrolyte layer 11*b*, the electrolyte layer 11*b* has size anisotropy in which the rate of size change in the direction of the $X_2$ axis is greater than the rate of size change in the direction of the $Y_2$ axis.

As shown in FIG. 5, when observed from a direction substantially parallel to the normal direction of the main surface of the reinforcement layer 11*a* and the main surface of the electrolyte layer 11*b* (from the direction indicated by the arrow P in FIG. 5), the reinforcement layer 11*a* and the electrolyte layer 11*b* are laminated such that the direction of the $X_1$ axis substantially corresponds with the direction of the $X_2$ axis.

The reinforcement layer 11*a* is made of a resin film, and has a plurality of openings 11*c* extending in the thickness direction as shown in FIG. 6. The openings 11*c* are most closely spaced in the main surface thereof. The strength anisotropy can be imparted to the reinforcement layer 11*a* by adjusting the placement pattern (arrangement), the shape, the number and the opening ratio of the openings 11.

In other words, under the assumption that an orthogonal coordinate system having an $X_1$ axis and a $Y_1$ axis is fixed on the main surface of the reinforcement layer 11*a* shown in FIG. 6, the strength anisotropy in which the tensile modulus of elasticity in the direction of the $X_1$ axis is grater than the tensile modulus of elasticity in the direction of the $Y_1$ axis can be imparted.

The resin film constituting the reinforcement layer 11*a* preferably has an opening ratio of 50 to 90%. Particularly, from the viewpoint of ion conductivity, it preferably has an opening ratio of not less than 50%. From the viewpoint of strength, it preferably has an opening ratio of not greater than 90%.

The openings 11*c* can be formed by press punching the film or using a laser.

The reinforcement layer 11*a* may be a porous film subjected to an extension process. Because the tensile modulus of elasticity in the extension direction of the porous film obtained by an extension process becomes greater than the tensile strength in the direction orthogonal to the extension direction, the extension direction substantially corresponds with the direction of the $X_1$ axis.

The condition "the extension direction in the extension process substantially corresponds with the direction of the $X_1$ axis" used herein means a condition in which the extension direction in the extension process and the direction of the $X_1$ axis are substantially parallel, and in which they are in agreement (parallel) with each other with a "deviation" within the scope that the effect of the present invention is obtained. The deviation includes a displacement resulting from a difference caused during the alignment step in the production of the composite electrolyte membrane of the present invention, etc.

In this case, the extension process may be uniaxial extension or biaxial extension. In the case of uniaxial extension, the uniaxial stretching direction is the direction of the $X_1$ axis. In the case of biaxial extension, in the biaxial extension process in the directions of the $X_1$ axis and the $Y_1$ axis, the degree of the extension in the direction of the $X_1$ axis should be larger.

The porous film constituting the reinforcement layer 11a preferably has a porosity of 50 to 90%. Particularly, from the viewpoint of ion conductivity, it preferably has a porosity of not less than 50%. From the viewpoint of strength, it preferably has a porosity of not greater than 90%. The pores can be formed by extension.

For the same reason as that given in the case of the opening ratio and the porosity, the thickness of the reinforcement layer 11a is preferably in the range of 3 to 80 μm because the thickness within the range can easily and surely provide sufficient ion conductivity and sufficient strength.

As the resin constituting the reinforcement layer 11a described above, from the viewpoint of chemical stability and mechanical stability, any of the following resins can be preferably used: polytetrafluoroethylene, fluoroethylene-propylene copolymer, tetrafluoroethylene-perfluoroalcoxyethylene copolymer, polyethylene, polypropylene, polyether amide, polyether imide, polyether ether ketone, polyethersulfone, polyphenylene sulfide, polyarylate, polysulfide, polyimide and polyimideamide.

The electrolyte layer 11b sandwiching the reinforcement layer 11a will be described with reference to FIGS. 4 and 5. As shown in FIGS. 4 and 5, in this embodiment, a pair of electrolyte layers 11b sandwich the reinforcement layer 11a, and the openings (pores) 11c of the reinforcement layer 11a are filled with a polymer electrolyte constituting the electrolyte layer 11b.

The material for the electrolyte layer 11b for use may be any polymer electrolyte that has conventionally been used for a polymer electrolyte fuel cell such as perfluorocarbonsulfonic acid. Needless to say, a polymer electrolyte membrane originally in the form of a membrane can also be used.

Preferred examples of the polymer electrolyte include those having, as a cation exchange group, a sulfonic acid group, a carboxylic acid group, a phosphonic acid group and a sulfonimide group. From the viewpoint of hydrogen ion conductivity, particularly preferred are the one having a sulfonic acid group.

The polymer electrolyte having a sulfonic acid group preferably has an ion exchange capacity of 0.5 to 1.5 meq/g dry resin. When the ion exchange capacity of the polymer electrolyte is not less than 0.5 meq/g dry resin, because it is unlikely that the resistance value of the electrolyte layer 11b increases during power generation, and therefore it is preferred. When the ion exchange capacity is not greater than 1.5 meq/g dry resin, because it is unlikely that the water content of the obtained electrolyte layer 11b increases and swells to clog the micropores, and therefore it is preferred. Particularly preferred ion exchange capacity is 0.8 to 1.2 meq/g dry resin.

The polymer electrolyte is preferably a copolymer containing a polymer unit based on a perfluorovinyl compound represented by $CF_2=CF-(OCF_2CFX)_m-O_p-(CF_2)_n-SO_3H$ (where m is an integer from 0 to 3, n is an integer from 1 to 12, p is 0 or 1, and X represents a fluorine atom or a trifluoromethyl group) and a polymer unit based on polytetrafluoroethylene.

Preferred examples of the fluorovinyl compound include the compounds represented by the following formulas (4) to (6). Note that, in the following formulas, q is an integer from 1 to 8, r is an integer from 1 to 8, and t is an integer from 1 to 3.

$$CF_2=CFO(CF_2)_q-SO_3H \quad (4)$$

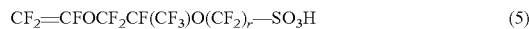

$$CF_2=CFOCF_2CF(CF_3)O(CF_2)_r-SO_3H \quad (5)$$

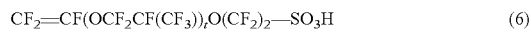

$$CF_2=CF(OCF_2CF(CF_3))_tO(CF_2)_2-SO_3H \quad (6)$$

Specific examples of the polymer electrolyte include Nafion (trade name) manufactured by E.I. Du Pont de Nemours & Co. Inc., USA and Flemion (trade name) manufactured by Asahi Glass Co, Ltd.

When the polymer electrolyte membrane is produced, the above listed polymer electrolyte can be used as the component material.

In the case where a polymer electrolyte membrane is used as the electrolyte layer 11b, and where substantially a rectangular-shaped reinforcement layer 11a and a rectangular-shaped reinforcement electrolyte layer 11b are used, the reinforcement layer 11a and the electrolyte layer 11b should be cut into substantially rectangular shapes that substantially correspond with each other and a substantially similar size, for example, by taking the longitudinal direction of the reinforcement layer 11a as the direction of the $X_1$ axis and the longitudinal direction of the electrolyte layer 11b as the direction of the $X_2$ axis. Thereby, the reinforcement layer 11a and the electrolyte layer 11b can be laminated and positioned accurately with the direction of the $X_1$ axis substantially corresponding with the direction of the $X_2$ axis as shown in FIG. 5 by just matching the longitudinal directions.

In the case where the reinforcement layer 11a and the electrolyte layer 11b do not have a substantially rectangular shape, a marking for positioning should be affixed to the reinforcement layer 11a and the electrolyte layer 11b.

The electrolyte layer 11b according to this embodiment can be formed by casting method using an ink for forming the electrolyte layer containing a polymer electrolyte and a dispersion medium. A preferred dispersion medium for use is a liquid containing an alcohol capable of dissolving or dispersing the polymer electrolyte (including a dispersed condition in which the polymer electrolyte is partially dissolved).

The dispersion medium preferably contains at least one selected from the group consisting of water, methanol, propanol, n-butylalcohol, isobutyl alcohol, sec-butylalcohol and tert-butylalcohol. The above listed water and alcohols may be used singly or in any combination of two or more. Particularly preferred alcohol is a linear alcohol having one OH group in the molecule. Ethanol is particularly preferred. The alcohol includes those having an ether bond such as ethylene glycol monomethyl ether.

The ink for forming the electrolyte layer can be prepared by a conventionally known method.

The electrolyte layer 11b can be produced by extrusion method, casting method or die coating method using the ink for forming the electrolyte layer. Even when any of the above methods is used, the resulting electrolyte layer 11b should have anisotropy in terms of size change.

When the electrolyte layer 11b is produced by extrusion method, the size change in the extrusion direction is small, and the size change in the direction orthogonal to the extrusion direction is large. Accordingly, the extrusion direction corresponds to the direction of the $Y_2$ axis, and the direction perpendicular to the extrusion direction corresponds to the direction of the $X_2$ axis.

When the electrolyte layer 11b is produced by casting method, the size change in the direction in which the ink for forming the electrolyte layer is cast is small. Accordingly, the casting direction corresponds to the direction of the $Y_2$ axis, and the direction perpendicular to the casting direction corresponds to the direction of the $X_2$ axis.

Further, when the electrolyte layer 11b is produced by die coating method, the size change in the film forming direction (MD) by a die coater is smaller than the size change in the direction (TD) orthogonal to the film forming direction. Accordingly, the MD corresponds to the direction of the $Y_2$ axis, and the TD corresponds to the direction of the $X_2$ axis.

The composite electrolyte membrane 11 according to this embodiment that can be produced as described above preferably has a thickness of 20 to 200 μm.

Because the composite electrolyte membrane 11 according to this embodiment has the structure described above and the reinforcement layer 11a and the electrolyte layer 11b are laminated such that the $X_1$ axis direction having a high tensile modulus of elasticity of the reinforcement layer 11a substantially corresponds with the $X_2$ axis direction having a high rate of size change of the electrolyte layer 11b, the size change of the electrolyte layer 11b in the direction of the $X_2$ axis is effectively prevented by the high tensile modulus of elasticity of the reinforcement layer 11a in the direction of the $X_1$ axis.

It is thus possible to easily and surely realize a highly reliable polymer electrolyte fuel cell capable of exhibiting sufficient cell performance for a long period of time.

Next, a catalyst-coated membrane assembly 20 according to this embodiment can be produced by forming a catalyst layer 12 on each surface of the composite electrolyte membrane 11.

In this embodiment, the catalyst layer 12 is formed by applying an ink for forming the catalyst layer directly to the center portion of each surface of the composite electrolyte membrane 11 obtained in the manner described above by means of a spraying method, printing method or coater method.

During the formation thereof, the electrolyte layer 11b included in the composite electrolyte membrane 11 might swell or contract by the ink for forming the catalyst layer, causing a change in size. In order to cope with this problem, in this embodiment, the ink for forming the catalyst layer is applied on each surface of the composite electrolyte membrane in a strip pattern such that the width direction of the strip portions substantially corresponds with the direction of the $X_1$ axis.

To be specific, first, the ink for forming the catalyst layer is applied in the form of a strip to form a first applied portion. Subsequently, the ink for forming the catalyst layer is then applied parallel to the first applied portion in the form of a strip to form a second applied portion. This operation is repeatedly performed to form the catalyst layer 12.

Figure 7:
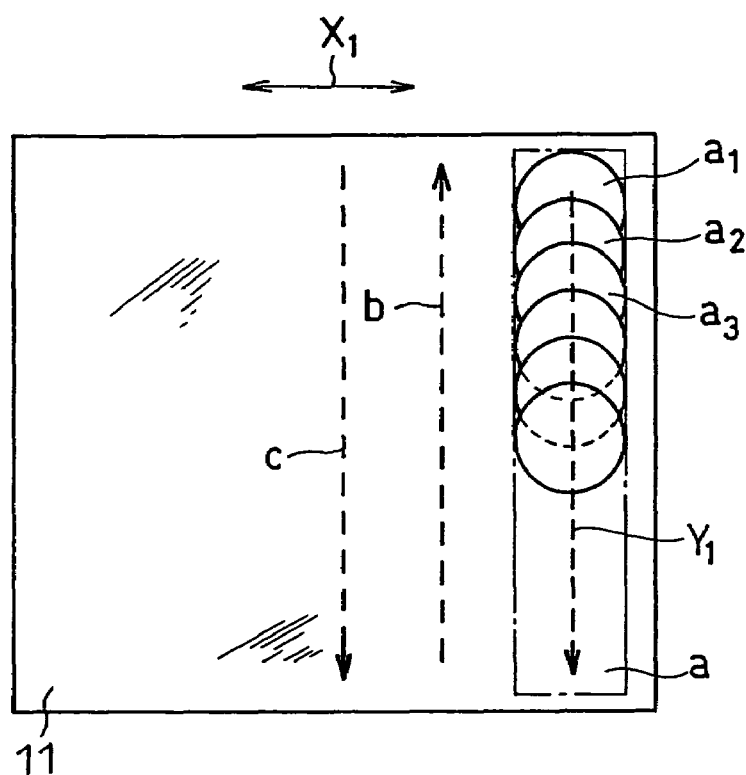
FIG. 7 is a diagram for explaining how to spray an ink for forming the catalyst layer on a main surface of the composite electrolyte membrane 11 according to Embodiment 1 of the present invention.

The method for producing the catalyst layer 12 will be described in further detail with reference to FIG. 7. FIG. 7 is a diagram for explaining how to spray the ink for forming the catalyst layer on a surface of the composite electrolyte membrane 11.

The composite electrolyte membrane 11 is fixed to a porous table such that the double-headed arrow $X_1$ shown in FIG. 7 corresponds to the direction of the $X_1$ axis. The ink is applied by moving a spray on the surface (main surface) of the composite electrolyte membrane 11 in the direction of the dotted arrow $Y_1$ shown in FIG. 7 (the direction of the $Y_1$ axis, i.e. the direction substantially orthogonal to the width direction of the strip portions) in the form of a strip. Specifically, by spraying the ink for forming the catalyst layer such that the applied portions partially overlap each other in the order of $a_1$, $a_2$, $a_3$, etc, a strip portion a is formed. Then, by spraying the ink by moving a spray in the direction opposite to that in which the strip portion a has been formed, a strip portion b is formed. In this manner, strip portions a, b, c, etc are formed to finally give a first catalyst layer 12.

The term "width direction of the strip portions" means a direction substantially orthogonal to a longer side (a side in the longitudinal direction) of each of the substantially rectangular (substantial rectangle) shaped strip portions a, b, c, etc, when the strip portions a, b, c, etc are observed from the substantially normal direction of the main surface of the composite electrolyte membrane 11 as shown in FIG. 7, given that each of the strip portions a, b, c, etc is regarded approximately as a substantially rectangular shape (substantial rectangle).

In order to reduce the unevenness of the ink in the surface direction of the catalyst layer 12 so as to make the catalyst layer 12 as uniform as possible, after the formation of the first catalyst layer, a second catalyst layer may be formed thereon in a position such that the strip portions of the second catalyst layer are slightly displaced from those of the first catalyst layer.

Further, a third layer may be formed. The catalyst layer 12 may have a multilayer structure by repeatedly performing the above-described operation.

The catalyst layer 12 is composed of conductive carbon particles carrying a noble metal electrode catalyst and a cation (hydrogen ion) conductive polymer electrolyte. The catalyst layer 12 is produced using an ink for forming the catalyst layer containing at least conductive carbon particles carrying a noble metal electrode catalyst, a hydrogen ion conductive polymer electrolyte and a dispersion medium.

As the polymer electrolyte, those listed above as the materials for electrolyte layer 11b can be used.

The electrode catalyst is carried on conductive carbon particles (powders) before use, and it is composed of metal particles. The metal particles are not specifically limited, and various metals can be used.

For example, the metal particles are preferably composed of at least one selected from the group consisting of platinum, gold, silver, ruthenium, rhodium, palladium, osmium, iridium, chromium, iron, titanium, manganese, cobalt, nickel, molybdenum, tungsten, aluminum, silicon, zinc and tin.

Particularly, a noble metal, platinum, and an alloy including platinum are preferred. For the anode, an alloy made of platinum and ruthenium is particularly preferred because it can stabilize the catalytic activity.

The conductive carbon particles preferably have a specific surface area of 50 to 1500 $m^2/g$. A specific surface area of not less than 50 $m^2/g$ is preferred because the electrode catalyst-carrying ratio can be easily increased and the output characteristics of the resulting catalyst layer 12 hardly decrease. A specific surface area of not greater than 1500 $m^2/g$ is preferred because the micropores are not too fine and the conductive carbon particles can be easily covered with the polymer electrolyte, and the output characteristics of the resulting catalyst layer 12 hardly decrease. Particularly preferred specific surface area is 200 to 900 $m^2/g$.

Further, the particles of the electrode catalyst preferably have an average particle size of 1 to 5 nm. An average particle size of not less than 1 nm is preferred because the electrode catalyst can be technically easily prepared. An average particle size of not greater than 5 nm is preferred because the activity of the electrode catalyst per weight does not decrease, leading to cost reduction of the fuel cell.

Further, the conductive carbon particles preferably have an average particle size of 0.1 to 1.0 μm. An average particle size of not less than 0.1 μm is preferred because the resulting catalyst layer 12 does not have too dense a structure and the gas diffusibility does not decrease, making it unlikely to cause flooding. An average particle size of not greater than 1.0 μm is preferred because the conductive carbon particles can be easily covered with the polymer electrolyte, the covered area is not reduced, and the performance of the catalyst layer 12 does not decrease.

In this embodiment, as the dispersion used for preparing the ink for forming the catalyst layer, those listed above as the dispersion used for the ink for forming the electrolyte layer can be used. The ink for forming the catalyst layer can be prepared by a conventionally known method.

Because the catalyst-coated membrane assembly 20 according to this embodiment that can be produced as described above includes the aforesaid composite electrolyte membrane 11, the composite electrolyte membrane 11 does not change in size by the water impregnated condition, the displacement thereof and the formation of wrinkles during the production of the polymer electrolyte fuel cell 1 are not caused, and damage is not caused during the production and operation of the polymer electrolyte fuel cell 1.

Further, because the reinforcement layer and the composite electrolyte membrane are laminated such that the $X_1$ axis direction having a high tensile modulus of elasticity in the reinforcement layer 11a substantially corresponds with the width direction of the strip portions constituting the catalyst layer 12 where the size change during drying is large, the size change of the catalyst layer in the width direction of the strip portions is effectively prevented by the high tensile modulus of elasticity of the reinforcement layer in the direction of the $X_1$ axis.

It is thus possible to easily and surely realize a polymer electrolyte fuel cell which is highly reliable and capable of exhibiting sufficient cell performance for a long period of time.

Next, a membrane-electrode assembly 10 according to this embodiment is obtained by placing gas diffusion layers 13 including a porous conductive substrate on both surfaces of the catalyst-coated membrane assembly 20, and joining the catalyst-coated membrane assembly 20 and the pair of gas diffusion layers 13 by means of a conventionally known method.

In this embodiment, it is preferred that, assuming that an orthogonal coordinate system having an $X_3$ axis and a $Y_3$ axis is fixed on a main surface of the gas diffusion layer 13, the gas diffusion layer 13 has strength anisotropy in which the tensile strength in the direction of the $X_3$ axis of the gas diffusion layer 13 is greater than the tensile strength in the direction of the $Y_3$ axis of the same. Additionally, the catalyst-coated membrane assembly 20 is sandwiched by a pair of gas diffusion layers 13 such that the direction of the $X_1$ axis of the reinforcement layer 11a is substantially orthogonal to the direction of the $X_3$ axis of the gas diffusion layer 13.

Figure 8:
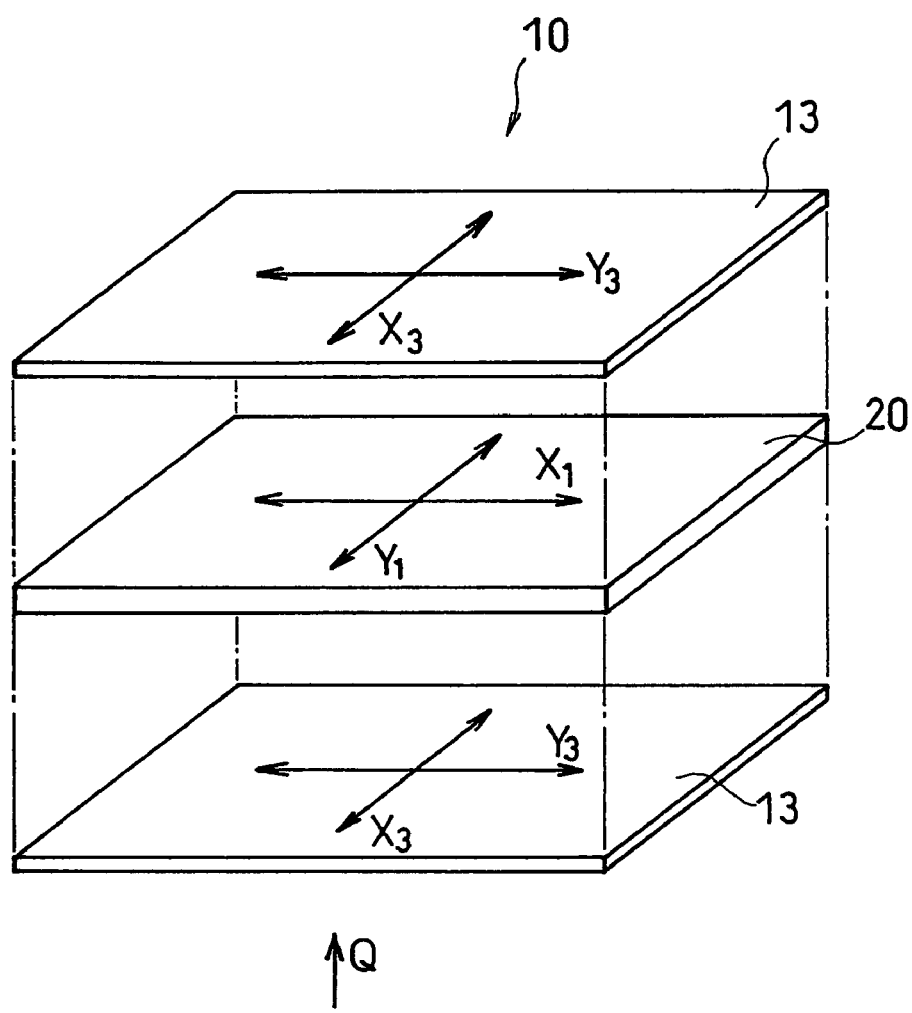
FIG. 8 is an exploded perspective view of a membrane-electrode assembly 10 according to Embodiment 1 of the present invention.

FIG. 8 is an exploded perspective view of a membrane-electrode assembly 10 according to Embodiment 1 of the present invention. As shown in FIG. 8, the catalyst-coated membrane assembly 20 and the gas diffusion layers 13 are laminated such that the direction of the $X_1$ axis is orthogonal to the direction of the $X_3$ axis when observed from a direction substantially parallel to the normal direction of the main surface of the catalyst-coated membrane assembly 20 and the main surface of the gas diffusion layers (from the direction shown by the arrow Q in FIG. 8).

As the porous conductive substrate, for example, a carbon nonwoven fabric such as carbon paper or a carbon woven fabric such as carbon cloth can be used. When a carbon cloth is formed of a weft thread and a warp thread thicker than the weft thread, for example, the length direction of the thick warp thread corresponds to the direction of the $X_3$ axis.

Because the membrane-electrode assembly 10 according to this embodiment includes the aforesaid catalyst-coated membrane assembly 20, the composite electrolyte membrane 11 does not change in size by the water impregnated condition, the displacement thereof and the formation of wrinkles during the production of the polymer electrolyte fuel cell 1 are not caused, and damage is not caused during the production and operation of the polymer electrolyte fuel cell 1.

Further, because the catalyst-coated membrane assembly 20 and the gas diffusion layers 13 are laminated such that the $X_1$ axis direction having a high tensile modulus of elasticity in the reinforcement layer 11a is substantially orthogonal to the $X_3$ axis direction having a large tensile strength in the gas diffusion layer 13, the size change of the electrolyte layer 11b in the direction of the $X_2$ axis is effectively prevented by the high tensile modulus of elasticity of the reinforcement layer 11a in the direction of the $X_1$ axis, and at the same time, the strength isotropy of the membrane-electrode assembly is ensured by the tensile strength of the gas diffusion layer in the direction of the $X_3$ axis.

It is thus possible to easily and surely realize a polymer electrolyte fuel cell which is highly reliable and capable of exhibiting sufficient cell performance for a long period of time.

Next, a polymer electrolyte fuel cell (unit cell 1) according to this embodiment includes the membrane-electrode assembly 10 and a pair of separator plates 16 sandwiching the membrane-electrode assembly 10.

Figure 9:
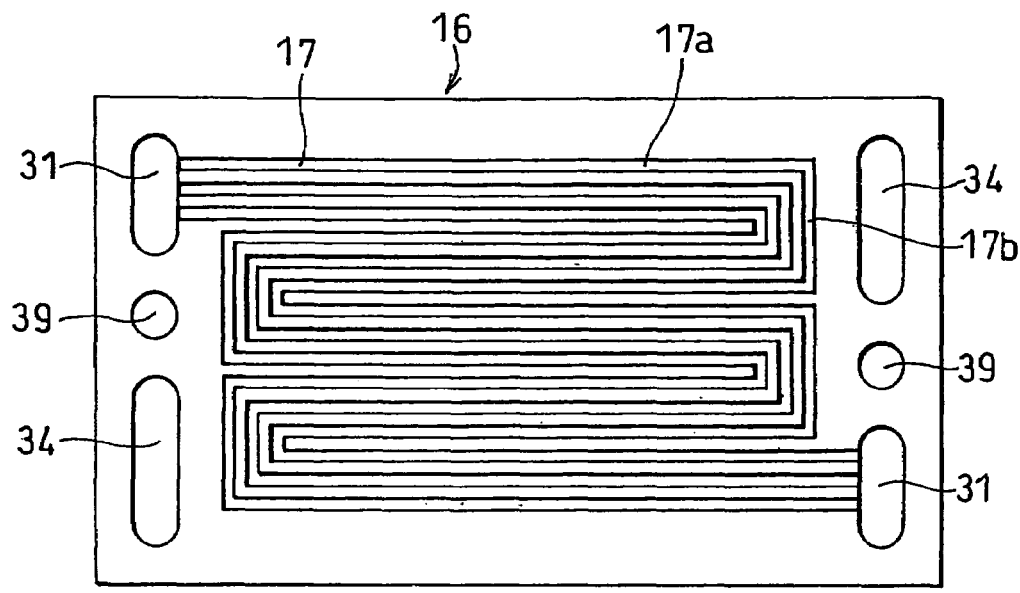
FIG. 9 is a front view of the separator plate 16 at the anode side shown in FIG. 1.

As shown in FIG. 9, the separator plate 16 has a gas channel 17 for supplying a reaction gas to the membrane-electrode assembly 10. The entire or most of the gas channel 17 is composed of a linear groove. The membrane-electrode assembly 10 is sandwiched by a pair of the separator plates 16 such that the $X_1$ axis direction is substantially orthogonal to the direction of the linear groove to construct a unit cell 1.

The gas channel 17 of the separator plate 16 is preferably a serpentine gas channel composed of linear grooves and joint parts connecting the linear grooves, or gas channels extending linearly from the inlet side to the outlet side (from the upstream to the downstream of the flow of reaction gas).

In other words, the entire or most of the gas channel 17 is preferably composed of linear grooves extending in the same direction.

Figure 10:
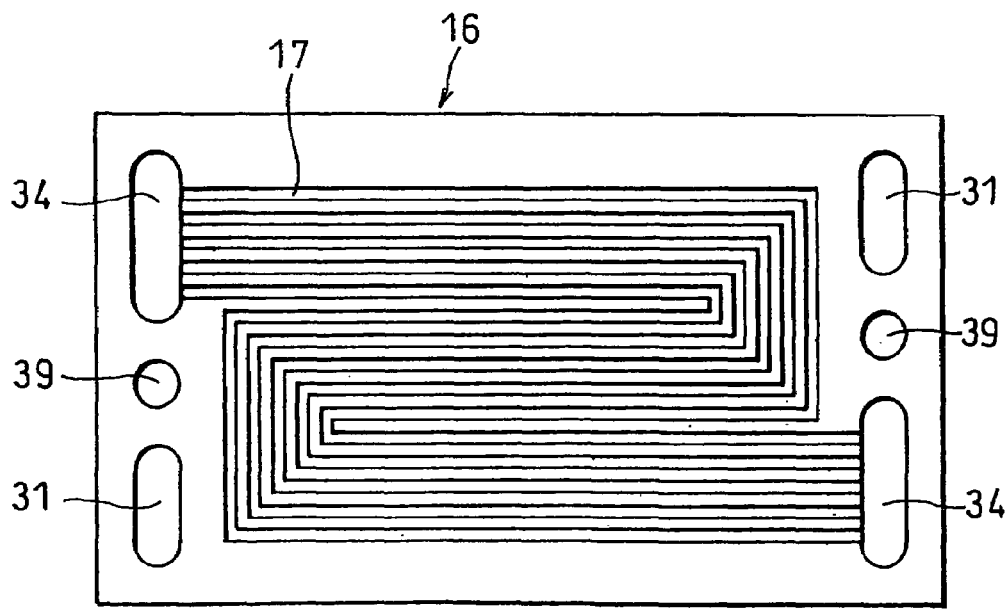
FIG. 10 is a rear view of the separator plate 16 at the anode side shown in FIG. 1 (i.e. a front view of the separator plate 16 at the cathode side).

FIGS. 9 and 10 show an example of the separator plate 16 according to this embodiment. FIG. 9 is a front view of the separator plate 16 at the anode side shown in FIG. 1. FIG. 10 is a rear view of the separator plate 16 at the anode side (i.e. a front view of the separator plate 16 at the cathode side) shown in FIG. 1.

As shown in FIG. 9, the anode-side separator plate 16 has a gas channel 17 composed of a groove connecting a pair of manifold apertures 31 for fuel gas. Likewise, as shown in FIG. 10, the cathode-side separator plate 16 has a gas channel 17 composed of a groove connecting a pair of manifold apertures 31 for oxidant gas.

The gas channel 17 is composed of linear grooves 17a extending in the horizontal direction and joint parts 17b connecting adjacent linear grooves 17a in FIG. 9. The joint parts 17b may be curved. The separator 16 and the membrane-electrode assembly 10 are arranged such that the direction of the linear grooves 17a extending in the horizontal direction, which account for a large proportion of the gas channel 17, is substantially orthogonal to the $X_1$ axis direction having a high tensile modulus of elasticity in the reinforcement layer 11a included in the composite electrolyte membrane 11.

This structure can be applied to the separator 16 in FIG. 10.

The term "direction of the linear grooves 17a" means a direction substantially parallel to a longer side (a side in the longitudinal direction) of a substantially rectangular shape (substantial rectangle), given that each of the linear grooves 17a is regarded as a substantially rectangular shape (substantial rectangle) when observed from the substantially normal direction of the main surface of the separator 16 as shown in FIGS. 9 and 10.

According to this structure, it is possible to sufficiently suppress the size change resulting from the swelling of the electrolyte layer 11b in the composite electrolyte membrane 11 due to water contained in the reaction gas flowing the gas channel 17 of the separator plate 16.

A detailed description is given of the size change with reference to the gas channel 17 of the anode-side separator plate 16 shown in FIG. 9. In the gas channel 17, the water (water vapor and condensed water) in the gas channel 17 on the fuel gas outlet side is greater in amount than the water (water vapor and condensed water) in the gas channel 17 on the fuel gas inlet side. This is because the amount of water produced by the electrode reaction increases toward the downstream side (outlet side) of the gas channel 17. For this reason, the degree of swelling (or the probability of swelling) of the electrolyte layer 11b included in the composite electrolyte membrane 11 differs (becomes nonuniform) depending on the portion of the composite electrolyte membrane 11 (the catalyst-coated membrane assembly 20 including the same, and the membrane-electrode assembly 10 including the catalyst-coated membrane assembly 20) corresponding to the gas channel 17 (i.e. depending on the area of the composite electrolyte membrane 11 corresponding to the gas channel 17).

However, because the polymer electrolyte fuel cell 1 according to this embodiment has the structure described above, even if nonuniformity occurs in the degree of swelling of the electrolyte layer 11b in the composite electrolyte membrane 11, the size change resulting from the nonuniformity can be sufficiently suppressed.

In the case of a conventional fuel cell including a separator plate 16 having a gas channel 17 with a structure similar to those shown in FIGS. 9 and 10, the electrolyte layer 11b repeatedly swells and contracts during the repetition of operation and stopping, and damage might proceed in the membrane-electrode assembly at the contact area between the membrane-electrode assembly and the edge portion of the gas channel 17 (specifically, when a slit might be caused along the direction of the linear grooves 17a). To the contrary, in the polymer electrolyte fuel cell 1 according to this embodiment, because it has the structure described above, the proceeding of the damage can be sufficiently suppressed.

The separators 16 in FIGS. 9 and 10 each have a pair of manifold apertures 39 for cooling water. On the rear side of each separator 16 shown in FIGS. 9 and 10 is formed a cooling water channel 18 composed of a groove connecting a pair of the manifold apertures 39 for cooling water. The cooling water channel 18 can have a shape similar to a conventional cooling water channel such as serpentine.

A single unit cell 1 constructed by fixing the membrane electrode assembly 10 with a pair of the separators 16 as described above can produce an electromotive force of about 0.7 to 0.8 V at a practical current density of several tens to several hundreds mA/cm$^2$ when the fuel gas is supplied to the gas channel 17 of one of the separators 16 and the oxidant gas is supplied to the gas channel 17 of the other of the separators 16.

Figure 11:
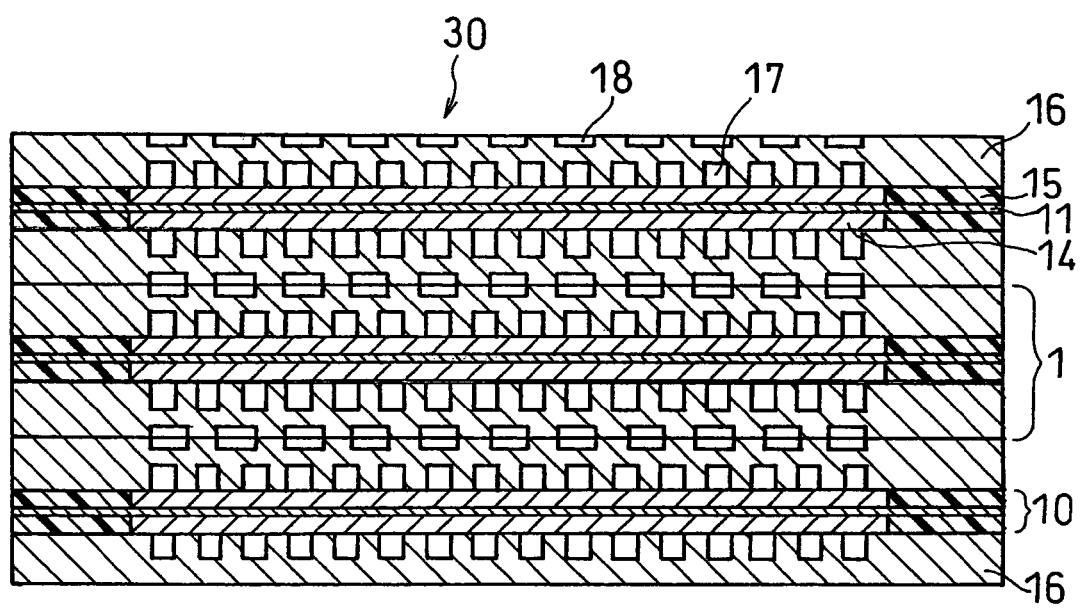
FIG. 11 is a partial cross sectional view of a stack 30 included in a polymer electrolyte fuel cell according to Embodiment 1 of the present invention.

A polymer electrolyte fuel cell, however, is usually required to produce a voltage of several to several hundreds volts when used as power sources. For this reason, in practice, the required number of unit cells 1 may be connected in series to give a stack for use as shown in FIG. 11. FIG. 11 is a partial cross sectional view of a stack 30 in a polymer electrolyte fuel cell according to this embodiment Because the polymer electrolyte fuel cell 1 according to this embodiment includes the aforesaid membrane-electrode assembly 10, the composite electrolyte membrane 11 does not change in size by the water impregnated condition, the displacement thereof and the formation of wrinkles during the production of the polymer electrolyte fuel cell 1 are not caused, and damage is not caused during the production and operation of the polymer electrolyte fuel cell 1.

Further, because the membrane-electrode assembly 10 and the separator plates 16 are laminated such that the $X_1$ axis direction having a high tensile modulus of elasticity in the reinforcement layer 11a is substantially orthogonal to the direction of the linear grooves of the gas channel of the separator plate 16, the size change of the electrolyte layer 11b in the direction of the $X_2$ axis resulting from water contained in the reaction gas flowing the gas channel 17 is effectively prevented by the high tensile modulus of elasticity of the reinforcement layer 11a in the direction of the $X_1$ axis.

It is thus possible to easily and surely realize a polymer electrolyte fuel cell which is highly reliable and capable of exhibiting sufficient cell performance for a long period of time.

Embodiment 2

A description will now be given of a polymer electrolyte fuel cell according to Embodiment 2 of the present invention. A polymer electrolyte fuel cell according to Embodiment 2 (not shown in the drawings) has a structure identical to that of the polymer electrolyte fuel cell 1 according to Embodiment 1 shown in FIG. 1 except that the structure of the composite electrolyte membrane 11 is changed.

In the following, a composite electrolyte membrane 41 (a composite electrolyte membrane according to Embodiment 2 of the present invention) included in a polymer electrolyte fuel cell 1 according to Embodiment 2 will be described.

Figure 12:
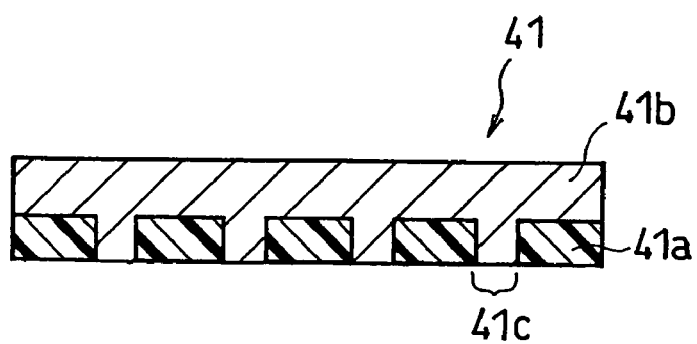
FIG. 12 is an enlarged cross sectional view of a relevant part of a composite electrolyte membrane 41 included in a polymer electrolyte fuel cell according to Embodiment 2 of the present invention.

FIG. 12 is an enlarged cross sectional view of a relevant part of a composite electrolyte membrane 41 included in a polymer electrolyte fuel cell according to Embodiment 2 of the present invention.

In the composite electrolyte membrane 41 in a polymer electrolyte fuel cell according to Embodiment 2, an electrolyte layer 41b is formed on one surface of a reinforcement layer 41a, and the polymer electrolyte constituting the electrolyte layer 41b is filled in the openings (pores) 41c of the reinforcement layer 41a.

Similar to Embodiment 1, in the composite electrolyte membrane 41 according to this embodiment, the reinforcement layer 41a and the electrolyte layer 41b are laminated such that the $X_1$ axis direction having a high tensile modulus of elasticity of the reinforcement layer 41a substantially corresponds with the $X_2$ axis direction of the electrolyte layer 41b where the size change is large.

Accordingly, the size change of the electrolyte layer 41b in the direction of the $X_2$ axis is effectively prevented by the high tensile modulus of elasticity of the reinforcement layer 11a in the direction of the $X_1$ axis.

Further, by using the composite electrolyte membrane 41 according to this embodiment, it is possible to provide a catalyst-coated membrane assembly and a membrane-electrode assembly that can easily and surely realize a highly reliable polymer electrolyte fuel cell capable of exhibiting sufficient cell performance for a long period of time.

Further, according to this embodiment, it is possible to easily and surely realize a highly reliable polymer electrolyte fuel cell capable of exhibiting sufficient cell performance for a long period of time.

Embodiment 3

A description will now be given of a polymer electrolyte fuel cell according to Embodiment 3 of the present invention. A polymer electrolyte fuel cell according to Embodiment 3 (not shown in the drawings) has a structure identical to that of the polymer electrolyte fuel cell 1 according to Embodiment 1 shown in FIG. 1 except that the structure of the composite electrolyte membrane 11 is changed.

In the following, a composite electrolyte membrane 51 (a composite electrolyte membrane according to Embodiment 3 of the present invention) included in a polymer electrolyte fuel cell 1 according to Embodiment 3 will be described.

Figure 13:
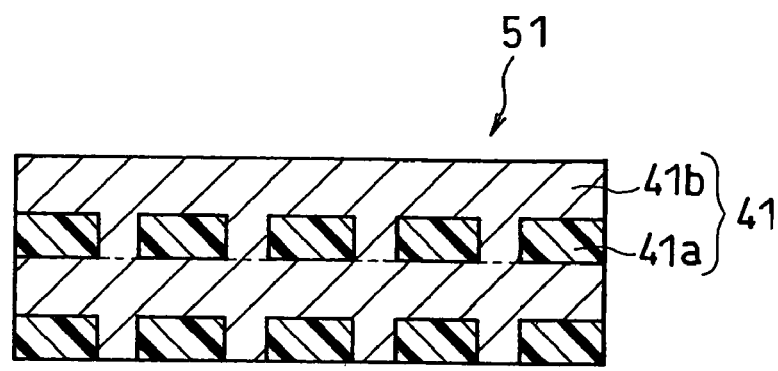
FIG. 13 is an enlarged cross sectional view of a relevant part of a composite electrolyte membrane 51 included in a polymer electrolyte fuel cell according to Embodiment 3 of the present invention.

FIG. 13 is an enlarged cross sectional view of a relevant part of a composite electrolyte membrane 51 included in a polymer electrolyte fuel cell according to Embodiment 3.

The composite electrolyte membrane 51 in a polymer electrolyte fuel cell according to Embodiment 3 is composed of two composite electrolyte membranes 41 according to Embodiment 2 laminated. In other words, two composite electrolyte membranes 41, each composed of the electrolyte layer 41b formed on one surface of the reinforcement layer 41a and the polymer electrolyte that constitutes the electrolyte layer 41b being filled in the openings (pores) 41c of the reinforcement layer 41a, are laminated.

Similar to Embodiment 1, in the composite electrolyte membrane 51 according to this embodiment, the reinforcement layer 41a and the electrolyte layer 41b are laminated such that the $X_1$ axis direction having a high tensile modulus of elasticity of the reinforcement layer 41a substantially corresponds with the direction of the $X_2$ axis of the electrolyte layer 41b where the size change is large.

Accordingly, the size change of the electrolyte layer 41b in the direction of the $X_2$ axis is effectively prevented by the high tensile modulus of elasticity of the reinforcement layer 11a in the direction of the $X_1$ axis.

Further, by using the composite electrolyte membrane 51 according to this embodiment, it is possible to provide a catalyst-coated membrane assembly and a membrane-electrode assembly that can easily and surely realize a highly reliable polymer electrolyte fuel cell capable of exhibiting sufficient cell performance for a long period of time.

Further, according to this embodiment, it is possible to easily and surely realize a highly reliable polymer electrolyte fuel cell capable of exhibiting sufficient cell performance for a long period of time.

The foregoing has described the embodiments of the present invention, but it is to be understood that the present invention is not limited to the above embodiments.

The present invention will be described in further detail below with reference to examples, but it is to be recognized that the present invention is not limited thereto.

EXAMPLE 1

In this example, the composite electrolyte membrane 11 shown in FIG. 4 was first produced.

Figure 14:
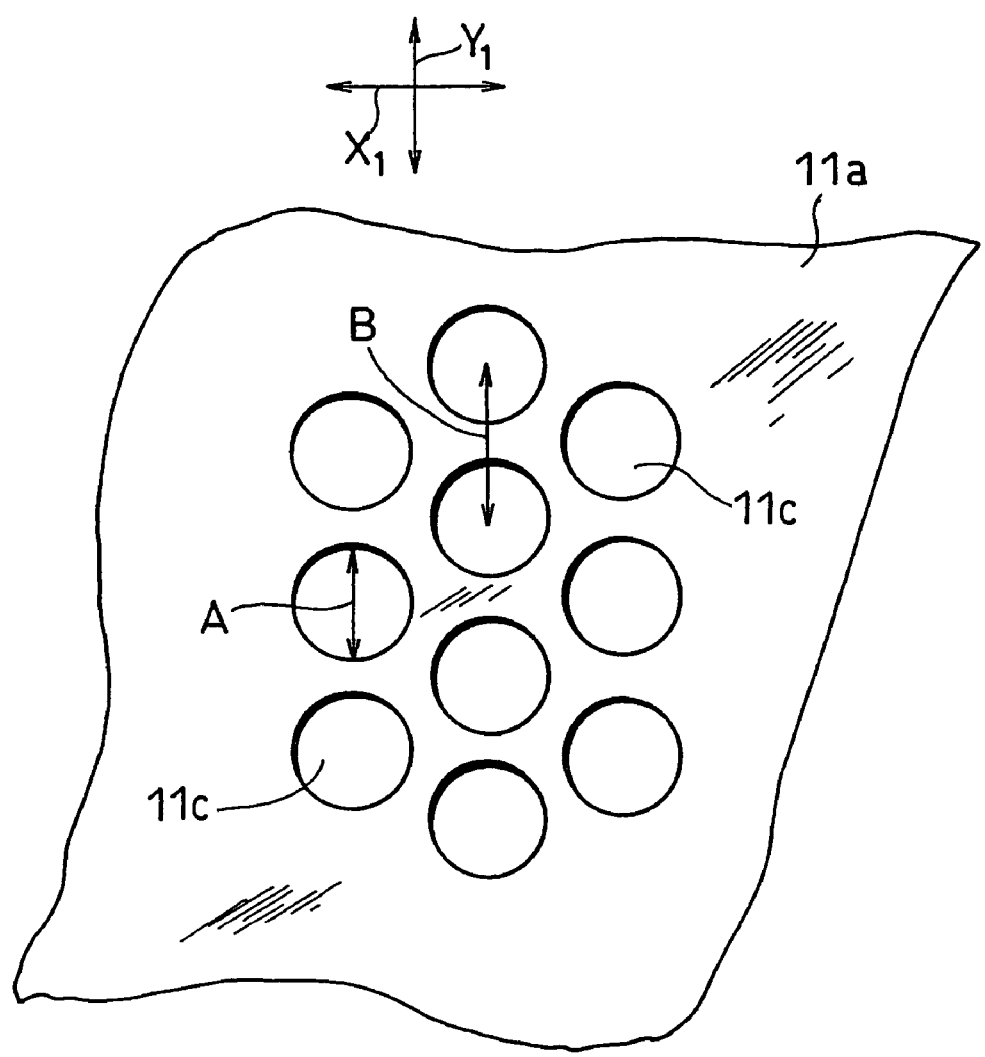
FIG. 14 is a diagram illustrating an arrangement of through apertures of a reinforcement layer 11a in EXAMPLE 1.

As shown in FIG. 14, the reinforcement layer 11a was produced by forming through apertures having a diameter A (=300 μm) in a polytetrafluoroethylene (PTFE) film having a thickness of about 10 μm by means of press punching such that the distance B between the centers of adjacent through apertures is 350 μm, and that the through apertures are most closely spaced on the plane surface of the film. In the reinforcement layer 11a, the tensile modulus of elasticity in the direction of the $X_1$ axis in FIG. 14 was higher than that in the direction of the $Y_1$ axis perpendicular to the direction of the $X_1$ axis. FIG. 14 is a diagram illustrating an arrangement of through apertures of the reinforcement layer 11a in EXAMPLE 1.

Meanwhile, a solution of perfluorocarbonsulfonic acid as the hydrogen ion conductive polymer electrolyte (SE20092 manufactured by E.I. Du Pont de Nemours & Co. Inc., USA, concentration: 20 wt %) was applied onto the PTFE sheet by die coating method, followed by drying to give a polymer electrolyte membrane having a thickness of about 10 μm. This was used as the electrolyte layer 11b.

In the polymer electrolyte membrane obtained by die coating method, the size change in the film forming direction (MD: $Y_2$ axis direction), in which the solution discharged from a die coater was applied, was smaller than that in the direction perpendicular to the above direction (TD: $X_2$ axis direction). Accordingly, the reinforcement layer 11a and the electrolyte layer 11b were combined such that the $X_1$ axis direction and the $X_2$ axis direction were in agreement with each other, followed by hot-pressing at a pressure of 30 kg/cm$^2$ and a temperature of 150° C. for 30 minutes to give a composite electrolyte membrane 11.

Then, a catalyst layer 12 was formed on each surface of the composite electrolyte membrane 11, and a catalyst-coated membrane assembly 20 having the structure shown in FIG. 3 was produced.

First, catalyst-carrying particles for the cathode side (Pt: 50 wt %) were prepared by allowing Ketjen Black EC (manufactured by AKZO Chemie Company of the Netherlands) having an average primary particle size of 30 nm serving as the conductive carbon particles to carry platinum particles having an average particle size of about 30 angstrome.

Meanwhile, catalyst-carrying particles for the anode side (Pt: 25 wt %, Ru: 25 wt %) were prepared by allowing Ketjen Black EC identical to that used above to carry platinum particles and ruthenium particles both having an average particle size of about 30 angstrome.

The catalyst-carrying particles for the anode side were mixed with water first, and then mixed with an ethanol dispersion of hydrogen ion conductive polymer electrolyte (Flemion manufactured by Asahi Glass Co., Ltd., concentration: 9 wt %) with stirring, whereby the surface of the catalyst-carrying particles was coated with the polymer electrolyte to give an ink for forming the anode-side catalyst layer. Similarly, an ink for forming the cathode-side catalyst layer was prepared using the catalyst-carrying particles for the cathode side.

The reason why water was added to the catalyst-carrying particles was to prevent the solvent contained in the dispersion from burning due to the catalyst. It is unnecessary to specifically limit the amount of water added as long as the entire catalyst is wet. Here, the composition of the dispersion medium used for the inks for forming the catalyst layers was adjusted such that the weight ratio of ethanol and water was 1:1.

Finally, ethanol was added such that the solid content of the inks for forming the catalyst layers was 7 wt % relative to the entire composition. The amount of polymer electrolyte was adjusted such that the amount of the polymer electrolyte contained in the resulting catalyst layer 12 would be 80% of the total amount of the conductive carbon particles in the catalyst-carrying particles.

Using spraying method, the inks for forming the catalyst layers prepared above were atomized. The ink for forming the anode-side catalyst layer was applied onto one main of the composite electrolyte membrane 11 and the ink for forming the cathode-side catalyst layer was applied onto the other surface of the same to form catalyst layers 12.

The thickness of the catalyst layer 12 was adjusted by the spray frequency, the opening of the nozzle (slit width), the ink discharging pressure and the like. The composite electrolyte membrane 11 was placed on a porous table connected to a vacuum pump, and then fixed by absorption. The porous table was equipped with a temperature control device for regulating room temperature. As such, it was possible to dry the applied inks for forming the catalyst layers in the desired duration of time.

To be specific, the composite electrolyte membrane 11 was fixed on the porous table such that the direction of the double-headed arrow shown in FIG. 7 corresponded to the direction of $X_1$ axis. The ink was then applied onto the surface of the composite electrolyte membrane 11 in the direction of the dotted arrow shown in FIG. 7 (the $Y_1$ axis direction) by moving a spray to form a strip portion.

In other words, by spraying the ink such that the applied portions partially overlapped each other in the order of $a_1$, $a_2$, $a_3$, etc, a strip portion a was formed. Then, by spraying the ink by moving a spray in the direction opposite to that in which the strip portion a had been formed, a strip portion b was formed. In this manner, strip portions a, b, c, etc were formed to finally form a first catalyst layer 12.

After the first catalyst layer 12 was formed, a second catalyst layer was formed by providing strip portions in a position 3 mm displaced from those of the first catalyst layer 12, and a third catalyst layer was formed by providing strip portions in a position 3 mm displaced from those of the second catalyst layer 12. In this manner, a three-layered catalyst layer 12 was formed on each surface of the composite electrolyte membrane 11.

In the manner described above, the catalyst-coated membrane assembly 20 of the present invention was produced. Subsequently, a membrane-electrode assembly 10 as shown in FIG. 2 was produced.

As the porous conductive substrate for constituting the gas diffusion layer 13, a thick carbon woven fabric (manufactured by Mitsubishi Chemical Corporation, outer dimension 16 cm×20 cm, thickness 300 µm) composed of a weft thread and a warp thread thicker than the weft thread was used. First, the porous conductive substrate was immersed in an aqueous dispersion of a fluorocarbon resin (Neoflon ND1, manufactured by DAIKIN INDUSTRIES, LTD.), dried and heated at 300° C. for 30 minutes to impart water repellency.

Further, the conductive carbon powders were mixed with an aqueous dispersion of PTFE fine powders to prepare an ink for forming the conductive water repellent layer. The ink for forming the conductive water repellent layer was applied onto one surface of the porous conductive substrate treated for water repellency by screen-printing method to form a conductive water repellent layer to finally give a gas diffusion layer 13. The surface of the conductive water repellent layer was partly embedded in the porous conductive substrate.

The catalyst-coated membrane assembly 20 was sandwiched by a pair of the gas diffusion layers 13 such that the conductive water repellent layer was in contact with the catalyst layer 12. The whole was joined by hot-pressing to give a membrane-electrode assembly 10.

In the above process, the catalyst-coated membrane assembly 20 and a pair of the gas diffusion layers 13 were arranged such that the length direction (the $X_3$ axis direction) of the thick warp thread of the carbon woven fabric serving as the porous conductive substrate was orthogonal to the direction (the $X_1$ axis direction) having a high tensile strength of the reinforcement layer 11a of the composite electrolyte membrane 11.

The hot-pressing was performed at a temperature of 100° C., a pressure of 10 kg/cm² with a pressing time of two minutes.

Using the membrane-electrode assembly 1 produced in the manner described above, a polymer electrolyte fuel cell (unit cell) 1 of the present invention having the structure shown in FIG. 1 was produced.

Rubber gaskets 15 were bonded on the outer peripheries of the composite electrolyte membrane 11 in the membrane-electrode assembly 10. The gaskets 15 had manifold apertures for fuel gas, oxidant gas and cooling water formed thereon.

Meanwhile, on one surface of a resin-impregnated graphite plate having an outer dimension of 20 cm×32 cm and a thickness of 2.0 mm was formed a gas channel 17 by providing a groove having a depth of 1.0 mm. On the other surface of the same was formed a cooling water channel by providing a groove having a depth of 1.0 mm. Thereby, a separator plate 16 was produced (see FIGS. 9 and 10).

The membrane-electrode assembly 10 was sandwiched by the anode-side separator plate 16 having a gas channel 17 for fuel gas formed on one surface thereof and a cooling water channel formed on the other surface thereof and the cathode-side separator plate 16 having a gas channel for oxidant gas on one surface thereof and a cooling water channel on the other surface thereof, whereby a unit cell 1 was obtained.

A plurality of the unit cells 1 thus obtained were stacked to give a stack having the structure shown in FIG. 11. Current collector plates made of stainless steel, insulating plates made of an electrically insulating material and end plates made of stainless steel were placed on both ends of the stack, which was then fixed with clamping rods. The clamping pressure was 10 kg/cm² per area of the separator plate 16.

Incidentally, the membrane-electrode assembly 10 was sandwiched by the separator plates 16 such that the direction having a high tensile modulus of elasticity of the reinforcement layer 11a of the composite electrolyte membrane 11 (direction of the $X_1$ axis) was orthogonal to the direction of the linear groove 17a of the gas channel 17.

In the manner described above, a polymer electrolyte fuel cell of the present invention (cell 1) was produced.

EXAMPLE 2

A composite electrolyte membrane 11 of the present invention was produced in the same manner as in EXAMPLE 1 except that, as the resin film for constituting the reinforcement layer 11a, a film having a thickness of about 15 µm and made of a copolymer of tetrafluoroethylene and perfluoroalkylvinylether (PFA) was used, and that a reinforcement layer 11a having the structure shown in FIG. 14 (through aperture diameter A=300 µm, distance B between the centers of adjacent through apertures=340 µm, most closely spaced) was produced by laser punching the film.

Subsequently, a catalyst-coated membrane assembly 20 was produced in the same manner as in EXAMPLE 1 except that a catalyst layer 12 was formed by applying the ink for forming the catalyst layer in a strip pattern using a die coater method.

In the production of the catalyst layer 12, the thickness thereof was adjusted by the gap of a slit, the moving speed and the like. In order to prevent the size change of the electrolyte layer 11b due to the swelling with the ink for forming the catalyst layer during the formation of the catalyst layer, the composite electrolyte membrane 11 was fixed on an appropriate support sheet by hot pressing or the like. Further, during the application of the ink for forming the catalyst layer using a die coater, the composite electrolyte membrane 11 was moved parallel to the direction having a high tensile modulus of elasticity of the reinforcement layer 11a (direction of the $X_1$ axis).

Other than the above, a membrane-electrode assembly 10 and a polymer electrolyte fuel cell (cell 2) were produced in the same manner.

EXAMPLE 3

A composite electrolyte membrane of the present invention was produced in the same manner as in EXAMPLE 1 except that, as the resin film for constituting the reinforcement layer 11a, a film having a thickness of about 15 µm and made of polyphenylene sulfide was used, and that a reinforcement layer 11a having the structure shown in FIG. 14 (through aperture diameter A=500 µm, distance B between the centers of adjacent through apertures=570 µm, most closely spaced) was produced by press punching the film.

Further, a catalyst-coated membrane assembly 20, a membrane-electrode assembly 10 and a polymer electrolyte fuel cell (cell 3) were produced in the same manner as in EXAMPLE 1.

EXAMPLE 4

A composite electrolyte membrane of the present invention was produced in the same manner as in EXAMPLE 1 except that a porous film having a thickness of about 8 µm and obtained by uniaxially extending a PTFE film was used as the reinforcement layer 11a. Here, because the tensile modulus of elasticity in the direction in which the porous film was uniaxially extended was high, the direction was determined to be the direction of the $X_1$ axis.

Further, a catalyst-coated membrane assembly, a membrane-electrode assembly and a polymer electrolyte fuel cell (cell 4) were produced in the same manner as in EXAMPLE 1.

COMPARATIVE EXAMPLE 1

A composite electrolyte membrane was produced in the same manner as in EXAMPLE 1 except that the direction of the $X_1$ axis was not corresponded with the direction of the $X_2$ axis, but the direction of the $X_1$ axis was orthogonalized to the direction of the $X_2$ axis.

Further, using the composite electrolyte membrane thus obtained, a catalyst-coated membrane assembly, a membrane-electrode assembly and a polymer electrolyte fuel cell (cell for comparison 1) were produced in the same manner as in EXAMPLE 1.

COMPARATIVE EXAMPLE 2

A catalyst-coated membrane assembly, a membrane-electrode assembly and a polymer electrolyte fuel cell (cell for comparison 2) were produced in the same manner as in EXAMPLE 1 except that a membrane composed of only the electrolyte layer among the composite electrolyte membrane was used instead of the composite electrolyte membrane used in EXAMPLE 1.

Evaluation Test 1

Figure 15:
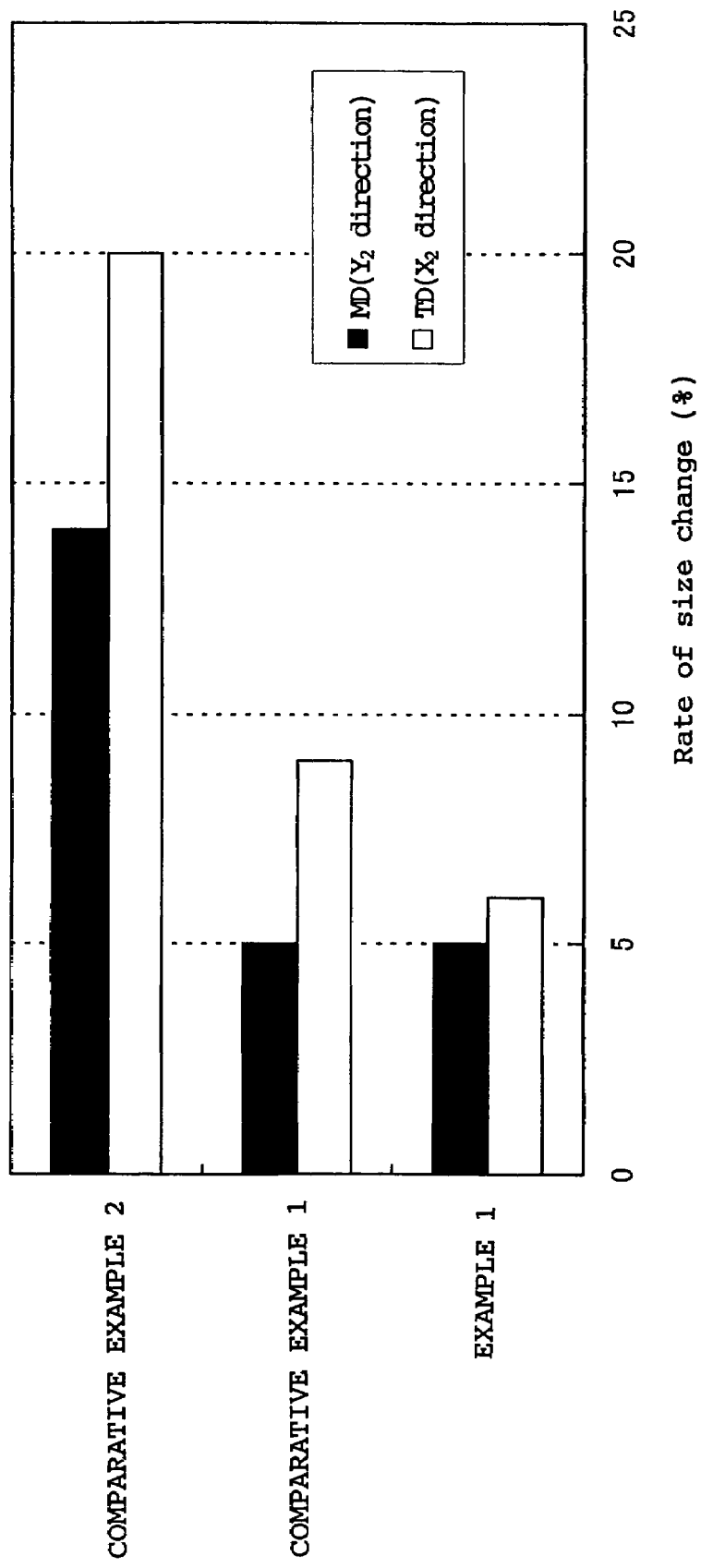
FIG. 15 is a graph showing the rate of size change for the composite electrolyte membranes of EXAMPLE and COMPARATIVE EXAMPLEs.

The composite electrolyte membranes (or membrane) produced in EXAMPLEs 1 to 4 and COMPARATIVE EXAMPLEs 1 and 2 were immersed in warm water kept at 90° C. for 2 hours, and the rate of size change was measured. The results of EXAMPLE 1 and COMPARATIVE EXAMPLEs 1 and 2 are shown in FIG. 15. In EXAMPLEs 2 to 4, results similar to that of EXAMPLE 1 were obtained.

Evaluation Test 2

Figure 16:
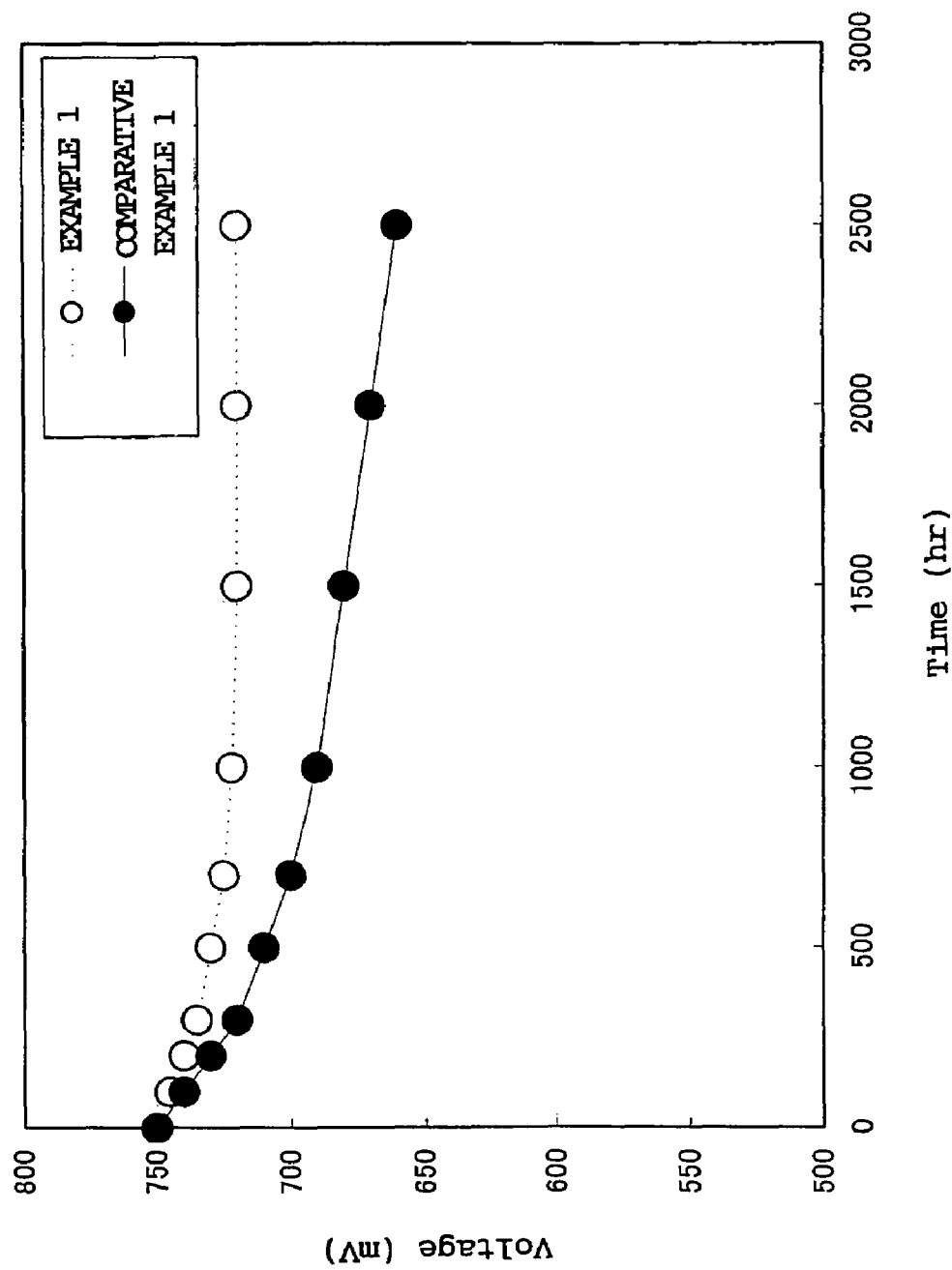
FIG. 16 is a graph showing the change of the voltage characteristics with time for the polymer electrolyte fuel cells of EXAMPLE and COMPARATIVE EXAMPLE.
Figure 17:
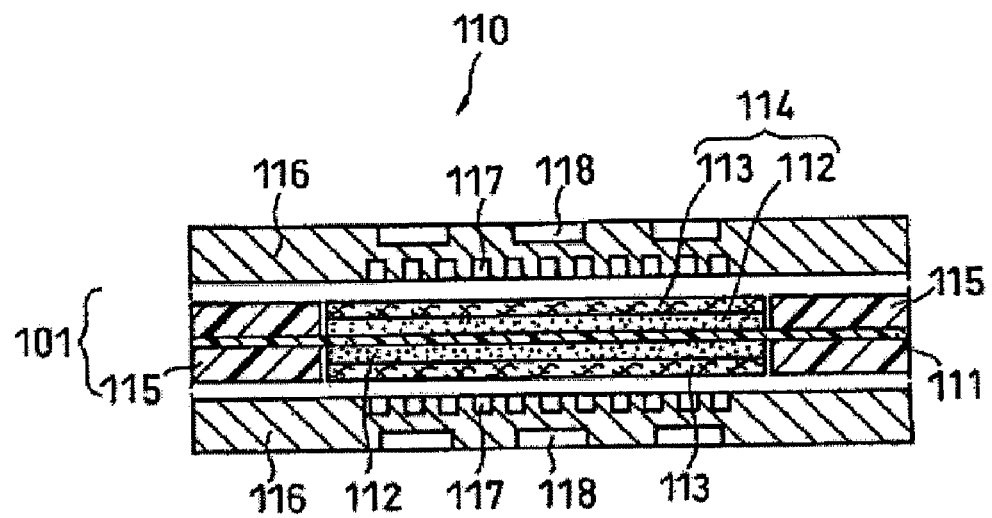
FIG. 17 is a schematic cross sectional view illustrating a basic structure of a unit cell designed to be mounted in a conventional polymer electrolyte fuel cell.
Figure 18:
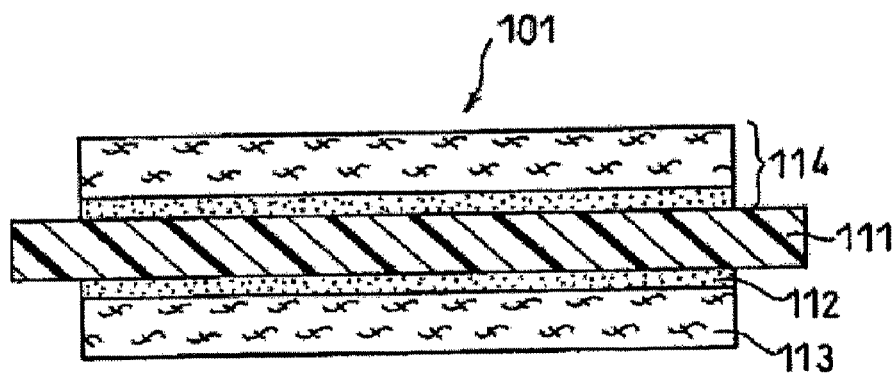
FIG. 18 is a schematic cross sectional view illustrating a basic structure of a membrane-electrode assembly designed to be mounted in the unit cell 110 shown in FIG. 17.

The polymer electrolyte fuel cells produced in EXAMPLEs 1 to 4 and COMPARATIVE EXAMPLEs 1 and 2 were maintained at 70° C. A hydrogen gas (fuel gas) and air (oxidant gas) heated and humidified to have a dew point of 70° C. were supplied to the anode and the cathode, respectively, and continuous operation was performed under the conditions of a fuel gas utilization rate of 70% and an oxidant gas utilization rate of 40%. FIG. 16 shows the change of the discharge characteristics with time for the polymer electrolyte fuel cells of EXAMPLE 1 and COMPARATIVE EXAMPLE 1. Note that, in FIG. 16, the change of the average voltage per unit cell is shown. In EXAMPLEs 2 to 4, results similar to that of EXAMPLE 1 were obtained. In COMPARATIVE EXAMPLE 2, a result similar to that of COMPARATIVE EXAMPLE 1 was obtained.

As is evident from the results shown in FIGS. 15 and 16, the composite electrolyte membranes of the present invention exhibited excellent size stability. It was found that the use of the composite electrolyte membranes can easily and surely provide a catalyst-coated membrane assembly, a membrane-electrode assembly and a polymer electrolyte fuel cell that are highly reliable and capable of exhibiting sufficient cell performance for a long period of time.

By using the composite electrolyte membrane of the present invention, it is possible to provide a highly reliable polymer electrolyte fuel cell. Accordingly, the polymer electrolyte fuel cell of the present invention is useful in various applications such as power sources for mobile and stationary applications, namely, power sources for mobile devices, automotive power sources, automotive auxiliary power units, power sources for cogeneration systems, etc.

The invention claimed is:

1. A composite electrolyte membrane comprising:
    a reinforcement layer made of a resin and having apertures therein; and an electrolyte layer made of a polymer electrolyte and laminated at least one main surface of the reinforcement layer,
    wherein, an axis $X_1$ and an axis $Y_1$ form an orthogonal coordinate system,
    wherein the orthogonal coordinate system is fixed on a main surface of the reinforcement layer,
    the reinforcement layer has strength anisotropy in which the tensile modulus of elasticity in the direction of the $X_1$ axis is greater than the tensile modulus of elasticity in the direction of the $Y_1$ axis,
    wherein, an axis $X_2$ and an axis $Y_2$ form an orthogonal coordinate system,
    wherein, the orthogonal coordinate system is fixed on a main surface of the electrolyte layer, the electrolyte layer has size anisotropy in which the rate of size change in the direction of the $X_2$ axis is greater than the rate of size change in the direction of the $Y_2$ axis, and
    the reinforcement layer and the electrolyte layer are laminated such that the direction of the $X_1$ axis substantially corresponds with the direction of the $X_2$ axis wherein the orthogonal coordinate systems are perpendicular to the electrolyte membrane and the reinforcement layer laminate direction.

2. The composite electrolyte membrane in accordance with claim 1, wherein the reinforcement layer comprises a film having, as the apertures, a plurality of openings extending in a thickness direction,
the plurality of openings are arranged such that they are most closely spaced on the main surface of the film, and
the openings are filled with the polymer electrolyte.

3. The composite electrolyte membrane in accordance with claim 2, wherein the film has an opening ratio of 50 to 90%.

4. The composite electrolyte membrane in accordance with claim 1, wherein the reinforcement layer comprises a porous film subjected to an extension process,
the extension direction of the extension process substantially corresponds with the direction of the $X_1$ axis, and
the apertures of the porous film are filled with the polymer electrolyte.

5. The composite electrolyte membrane in accordance with claim 4, wherein the porous film has a porosity of 50 to 90%.

6. The composite electrolyte membrane in accordance with claim 1, wherein the resin is at least one selected from the group consisting of polytetrafluoroethylene, fluoroethylene-propylene copolymer, tetrafluoroethylene-perfluoroalcoxy-ethylene copolymer, polyethylene, polypropylene, polyether amide, polyether imide, polyether ether ketone, polyethersulfone, polyphenylene sulfide, polyarylate, polysulfide, polyimide and polyimideamide.

7. A catalyst-coated membrane assembly comprising the composite electrolyte membrane in accordance with any one of claims 1 to 6 and a catalyst layer formed on at least one main surface of the composite electrolyte membrane by applying an ink for forming the catalyst layer in a strip pattern such that the width direction of the strip portions substantially corresponds with the direction of the $X_1$ axis.

8. A membrane-electrode assembly comprising the catalyst-coated membrane assembly in accordance with claim 7 and a pair of gas diffusion layers sandwiching the catalyst-coated membrane assembly,
wherein, assuming that an orthogonal coordinate system having an $X_3$ axis and a $Y_3$ axis is fixed on a main surface of the gas diffusion layer, the gas diffusion layer has strength anisotropy in which the tensile strength in the direction of the $X_3$ axis is greater than the tensile strength in the direction of the $Y_3$ axis, and
the catalyst-coated membrane assembly is sandwiched by the pair of gas diffusion layers such that the direction of the $X_1$ axis is substantially orthogonal to the direction of the $X_3$ axis.

9. A polymer electrolyte fuel cell comprising the membrane-electrode assembly in accordance with claim 8 and a pair of separator plates sandwiching the membrane-electrode assembly,
wherein the separator plate has a gas channel for supplying a reaction gas to the membrane-electrode assembly,
the entire or most of the gas channel comprises a linear groove, and
the membrane-electrode assembly is sandwiched by the pair of separator plates such that the direction of the $X_1$ axis is substantially orthogonal to the direction of the linear groove.

* * * * *